(12) United States Patent
Tcherniak et al.

(10) Patent No.: US 11,150,747 B2
(45) Date of Patent: Oct. 19, 2021

(54) METHOD OF DETERMINING SPATIAL CONFIGURATIONS OF A PLURALITY OF TRANSDUCERS RELATIVE TO A TARGET OBJECT

(71) Applicant: Hottinger Brüel & Kjær A/S, Nærum (DK)

(72) Inventors: Dmitri Tcherniak, Humlebæk (DK); Martin Qvist Olsen, Holte (DK)

(73) Assignee: Hottinger Brüel & Kjær A/S, Nærum (DK)

( * ) Notice: Subject to any disclaimer, the term of this patent is extended or adjusted under 35 U.S.C. 154(b) by 0 days.

(21) Appl. No.: 17/250,098

(22) PCT Filed: May 22, 2019

(86) PCT No.: PCT/EP2019/063264
§ 371 (c)(1),
(2) Date: Nov. 24, 2020

(87) PCT Pub. No.: WO2019/224277
PCT Pub. Date: Nov. 28, 2019

(65) Prior Publication Data
US 2021/0216151 A1    Jul. 15, 2021

(30) Foreign Application Priority Data
May 25, 2018   (EP) .................................... 18174296

(51) Int. Cl.
*G06F 3/0346*   (2013.01)
*H04L 29/08*    (2006.01)

(52) U.S. Cl.
CPC ............ *G06F 3/0346* (2013.01); *H04L 67/12* (2013.01)

(58) Field of Classification Search
CPC ............................... G06F 3/0346; H04L 67/12
See application file for complete search history.

(56) References Cited

U.S. PATENT DOCUMENTS 5,128,671 A *  7/1992  Thomas, Jr. ............ A63F 13/06
                                                  341/20
5,875,257 A *  2/1999  Marrin .................. G06F 3/0346
                                                  382/107
(Continued)

FOREIGN PATENT DOCUMENTS

EP            3073226 A1    9/2016
WO    WO 02/059627 A1    8/2002
(Continued)

OTHER PUBLICATIONS

European Patent Office, Decision to Grant a European patent pursuant to Article 97(1) EPC, in Application No. EP 18174296.6, dated Aug. 13, 2020 (2 pages).
(Continued)

*Primary Examiner* — David D Davis
(74) *Attorney, Agent, or Firm* — Nixon Peabody LLP

(57) ABSTRACT

A method of determining respective spatial configurations, indicative of respective positions and orientations, of a plurality of transducers attached to a target object, comprises receiving sensor signals from each transducer. The sensor signals are indicative of respective movements of the respective transducers during an induced movement of the target object. The method includes determining the spatial configurations of the transducers that comprise a first and second subset of transducers. The determining of the spatial configurations of the plurality of transducers comprises (i) obtaining the spatial configurations of the first subset of transducers, and (ii) determining the spatial configurations of the second subset of transducers from the received sensor signals and from the obtained spatial configurations of the first subset of transducers. The determining of the spatial configurations of the second subset of transducers comprises (Continued)

computing object accelerations indicative of accelerations of the target object relative to a reference coordinate system.

18 Claims, 8 Drawing Sheets

(56) References Cited

U.S. PATENT DOCUMENTS

| | | | |
|---|---|---|---|
| 6,729,176 | B2 | 5/2004 | Begin |
| 7,058,505 | B1 | 6/2006 | Milelli |
| 8,037,759 | B2 | 10/2011 | Peters |
| 8,098,150 | B2 | 1/2012 | Zhang |
| 8,283,921 | B2 | 10/2012 | Huber |
| 8,915,116 | B2 | 12/2014 | Stanley |
| 9,561,019 | B2 | 2/2017 | Mihailescu |
| 2013/0081442 | A1 | 4/2013 | Basir |
| 2017/0079723 | A1 | 3/2017 | Fleig |
| 2018/0075619 | A1* | 3/2018 | Kabel ............ G06T 7/70 |

FOREIGN PATENT DOCUMENTS

| | | |
|---|---|---|
| WO | WO 2016/135198 A1 | 9/2016 |
| WO | WO 2017/028916 A1 | 2/2017 |

OTHER PUBLICATIONS

Seel, T. et al.; "Joint Axis and Position Estimation from Inertial Measurement Data by Exploiting Kinematic Constraints"; 2012 IEEE Intl. Conference on Control Applications (CCA), pp. 45-49; Oct. 3-5, 2012; Dubrovnik, Croatia (5 pages).

Schopp, P. et al.; "Self-Calibration of Accelerometer Arrays"; IEEE Transactions on Instrumentation and Measurement, vol. 65, No. 8, pp. 1913-1925; Aug. 2016 (13 pages).

* cited by examiner

METHOD OF DETERMINING SPATIAL CONFIGURATIONS OF A PLURALITY OF TRANSDUCERS RELATIVE TO A TARGET OBJECT

CROSS-REFERENCE TO RELATED APPLICATIONS

This application claims priority to and the benefit of International Application No. PCT/EP2019/063264, filed May 22, 2019, and European Application No. 18174296.6, filed May 25, 2018, now granted as EP3572819B1, each of which is incorporated by reference in its entirety.

In one aspect, the present disclosure relates to a method of determining spatial configurations of a plurality of transducers, in particular accelerometers, relative to a target object, the plurality of transducers being attached to the target object.

BACKGROUND

In many applications, such as structural analysis, vibration measurement, etc. multiple transducers, such as accelerometers, are typically attached to a target object, e.g. using an adhesive or a suitable mounting device. The position and spatial orientation, of the individual transducers relative to the target object typically need to be established with a reasonable accuracy in order to facilitate useful measurement results. In particular, it may be desirable to establish the spatial configuration of the transducers relative to a digital model e.g. a CAD model, a FE model, or the like, of the target object.

For the purpose of the present description the term "spatial configuration" of a body, in particular of a transducer, refers to the position and the orientation of the body relative to a suitable reference coordinate system.

The checking and verification of the spatial configurations, i.e. positions and orientations, of multiple transducers of large measurement set-ups remain a considerable challenge in numerous types of applications, such as in structural analysis, vibration measurement, etc. As dimensions of the target objects grow, the number of measurement locations on the target object grows. This is typically followed by a corresponding growth in the number of transducers contained in the measurement set-up. Moreover, many target objects have a complicated geometry including complicated surface structures which render the determination of the spatial configurations of the transducers difficult.

Consequently, opportunities for mistakes or errors in the measurement set-up such as incorrectly placed transducers, erroneous spatial configuration, etc. may grow even faster. There have recently been advances in so-called "smart sensors" that comprise non-volatile semiconductor memory. The semiconductor memory is capable of electronically storing various types of useful transducer information such as serial number, calibration value, and location in a standardized format defined within the IEEE-P1451.4 standard. The latter format is now designated Transducer Electronic Data Sheet (TEDS). Each TEDS compliant transducer is capable of transmitting its stored transducer information to a remote measurement system or equipment via a standardized communication protocol. The remote measurement system may automatically load the transducer information directly into a set-up description or file of the measurement system. This feature may therefore reduce human errors associated with manually entering the transducer data into the measurement system.

However, the checking and verification of the position and/or spatial orientation of each transducer in such measurement set-ups remain a significant challenge. The appropriate spatial configurations of the transducers are important in numerous types of vibration measurements to ensure the intended or at least known component of e.g. acceleration is measured by the transducer at the intended or at least known position.

WO 2016/135198 discloses a method of detecting a spatial orientation of a transducer by a handheld optical scanning device. To this end, this prior art method uses a spatial orientation feature on an outer housing surface of the transducer.

While the above prior art method considerably reduces the time and effort required to determine the spatial orientation of transducers, the method still requires a manual determination of the individual transducers. Moreover, it is often desirable to obtain both position and orientation coordinates. Yet further, it may be desirable to position transducers at positions on a target subject that are difficult to reach, e.g. in small orifices, where it is difficult to scan a spatial orientation feature.

Hence, there remains a need for an improved method that allows the determination of spatial configurations, i.e. positions and orientations, of even large sets of transducers relative to a target object to which the transducers are attached in a time and cost efficient manner and with a sufficiently high accuracy.

SUMMARY OF THE INVENTION

According to a first aspect, disclosed herein are embodiments of a computer-implemented method of determining respective spatial configurations, indicative of respective positions and orientations, of a plurality of transducers attached to a target object; the method comprising:
  receiving sensor signals from each of the plurality of transducers, the sensor signals being indicative of respective movements of the respective transducers during an induced movement of the target object;
  determining the spatial configurations of the plurality of transducers; wherein the spatial configurations, indicative of the positions and orientations relative to the target object, of at least a subset of the transducers are determined based on the received sensor signals.

The inventors have realized that the spatial configurations of multiple transducers, including their positions and orientations relative to a target object to which they are attached, may efficiently be determined at a sufficiently high accuracy based on the sensor signals from the multiple of transducers and possibly other transducers attached to the target object. Accordingly, the need for manually measuring the positions and orientations of all transducers attached to a body is eliminated or at least greatly reduced. Consequently, the time and effort needed to establish the spatial configurations of all transducers is greatly reduced, in particularly when the subset of transducers includes a large number of transducers.

In preferred embodiments, the method receives information representing only a part of the spatial configurations of the plurality of transducers as an input. Hence, the process only needs to determine a remaining part of the spatial configurations in order to establish the complete spatial configurations of all transducers of the plurality of transducers. Said information may include the spatial configurations of a first subset of transducers, in particular information defining both the positions and the orientations of the transducers of a first subset. To this end the information may include information representing coordinates along six degrees of freedom (three positions and three rotational degrees of freedom) for each transducer of the first subset of the transducers. Alternatively or additionally, the information may include spatial relationships between at least a first subset of transducers. The spatial relationships may be relative distances between pairs of transducers, partial information about the orientation of the transducers, e.g. a direction of one axis of a measurement coordinate system of the transducer, or other partial spatial configurations representing coordinates along fewer than six degrees of freedom, e.g. coordinates along one or two or three degrees of freedom. Hence, the received information representing only a part of the spatial configurations of the plurality of transducers may represent complete spatial configurations of only a first subset of the transducers and/or partial spatial configurations of at least a first subset of the transducers.

Accordingly, the plurality of transducers may be divided into a first subset and a second subset of transducers, the second subset being different from the first subset; in particular, the subsets may be non-overlapping. According to some embodiments, determining the spatial configurations of the plurality of transducers may thus comprise:

obtaining spatial configurations of the transducers of the first subset; and determining the spatial configurations of the transducers of the second subset from the received sensor signals and from the obtained spatial configurations of the transducers of the first subset.

Accordingly, once the spatial configurations of the first subset of transducers are known, the spatial configurations of the second subset of transducers may be automatically determined from their respective sensor signals and from the known spatial configurations of the first subset. Consequently, the time and effort needed to establish the spatial configurations of all transducers is greatly reduced, in particular since the first subset of transducers may be much smaller than the second subset of transducers. For example, if one hundred or more transducers are attached to a target object it may be sufficient to include only few of them, e.g. only three transducers, into the first subset. Once the spatial configurations of these have been established, e.g. manually in a conventional manner or computed from known spatial relationships of the transducers of the first subset and from received sensor signals, the spatial configurations of all remaining transducers may be automatically determined. For the purpose of the present description, the transducers of the first subset will also be referred to as reference transducers. Generally, the spatial configuration of a transducer attached to a target object may be expressed as a transformation between a measurement coordinate system of the transducer and a local coordinate system of the target object. Alternatively, the spatial configuration of a transducer attached to a target object may be expressed as a transformation between a measurement coordinate system of the transducer and a global coordinate system. The measurement coordinate system of the transducer may define the axes along which accelerations are measured by the transducer.

Each transducer may be or comprise a single-axis or multi-axis, e.g. triaxial, accelerometer. The sensor signals from a transducer may represent one or more series of measurements by said transducer. For example, each measurement may be indicative of accelerations along one or more directions, e.g. in three directions. A triaxial accelerometer may provide a time series of measurements, where each measurement represents an acceleration vector relative to a measurement coordinate system of the accelerometer. Other examples of transducers include strain gauges, proximity probes and inclinometers or other measurement devices operable to measure movements, accelerations, forces or other quantities from which movements of the target object can be derived.

The spatial configurations of the transducers of the first subset may be obtained in any suitable manner, e.g. determined and entered manually. For example, the transducers of the first subset may be mounted to the target object at easily identifiable positions on the surface of the target object, e.g. at some distinct features of the target object's geometry that may be used as "anchor points" to place the transducers. The transducers may be mounted at said positions using spirit levels and/or swivel bases so as to align the transducers relative to the direction of gravity. The thus identified positions and orientations may manually be entered into a suitable measurement system, e.g. using a suitable digital 3D model, e.g. a CAD model, of the target object. Hence in some embodiments, obtaining the spatial configurations of the transducers of the first subset comprises receiving the spatial configurations of the transducers of the first subset as an input. In other embodiments, the process does not receive the precise spatial configurations of the transducers of the first subset but merely information indicative of a set of spatial relationships between the transducers of the first subset. The process then computes, from the received information and from the received sensor signals, the spatial configuration of the transducers of the first subset.

Preferably, the first subset comprises a number of transducers sufficient to measure movement of the target object along all its degrees of freedom. For a target object that is supported such that it can perform translatory movement along three orthogonal directions and rotational movement around three around orthogonal axes, the number of transducers may be selected sufficient to measure movement of the target object along six degrees of freedom, namely three translatory degrees of freedom and three rotational degrees of freedom. The exact number of transducers required depends on the capabilities of the transducers and of their relative positions relative to the target object and of the number of degrees of freedom of movement of the target object. For example, when the transducers are triaxial accelerometers, three transducers are sufficient for forming the first subset when the three transducers are not positioned along a straight line. Preferably, the three transducers should also be positioned sufficiently far from each other or at least as far from each other as the geometry of the target object permits.

In some embodiments, the method comprises verifying whether the first subset includes a sufficient number of transducers and/or whether the transducers are adequately positioned. For example, in some embodiments where each transducer comprises a triaxial accelerometer, each transducer may be associated with a transducer transmissibility matrix representing a transformation between accelerations, in particular translational and rotational accelerations, of the transducer relative to a local coordinate system of the target object to accelerations measured by said transducer along the axes of a measurement coordinate system of the transducer. Generally, the transducer transmissibility matrix of a transducer attached to a target object represents the position and orientation of a measurement coordinate system of the transducer relative to a local coordinate system of the target object. Accordingly, for known positions and orientations of the transducers relative to the target object, the transducer transmissibility matrix may be determined from said known positions and orientations. Verifying whether the first subset includes a sufficient number of transducers may then comprise verifying whether a transformation matrix constructed from the transducer transformation matrices of the transducers of the first subset has full rank. If the transformation matrix has full rank, the process may determine that the first subset includes a sufficient number of transducers.

In some embodiments, the process comprises determining whether the induced movement is sufficient for determining the spatial configuration of the transducers, e.g. the transducers of the second subset of transducers. To this end, in some embodiments where each transducer comprises a triaxial accelerometer, determining whether the caused movement is sufficient for determining the spatial configuration of the transducers of the second subset of transducers comprises:

receiving sensor signals indicative of measured accelerations of the transducers during the induced movement;

optionally performing a low-pass filtering of the sensor signals;

determining whether a local acceleration matrix representing the measured accelerations has a predetermined number of dominant singular values, e.g. six dominant singular values corresponding to unrestricted movement. This determination may be made by comparing the largest singular values (e.g. the largest six dominant values) with the largest one of the remaining singular values.

If the local acceleration matrix comprises a sufficient number of (e.g. six) dominant singular values, determining that the caused movement is sufficient for determining the spatial configuration of the transducers of the second subset of transducers.

Generally, in some embodiments, in particular in certain embodiments where the target object may move along all six degrees of freedom, the method comprises filtering the recorded signals so as to supress frequencies associated with flexural modes of the induced movements. In particular, in some embodiments, the method comprises low-pass filtering of the sensor signals. To this end, the process may comprise detecting a natural frequency of a lowest flexural mode and a natural frequency of the highest rigid-body mode; selecting a cut-off frequency of the low-pass filter so as to suppress at least a majority of the flexural modes and to maintain at least a majority of the rigid body modes. To this end the cut-off frequency may be selected larger than the detected natural frequency of the highest rigid body mode and smaller than the detected natural frequency of a lowest flexural mode.

Determining the spatial configurations of the transducers of the second subset of transducers may comprise:

computing, from the received sensor signals of the transducers of the first subset and the obtained spatial configurations of the transducers of the first subset, object accelerations indicative of accelerations of the target object relative to a reference coordinate system;

computing, from the computed object accelerations and from the received sensor signals of respective transducers of the second subset, said spatial configurations of the transducers of the second subset.

In particular, the object accelerations may represent the spatial configuration, differentiated twice with respect to time, of a local coordinate system of the target object relative to an inertial reference coordinate system.

Computing the object accelerations may comprise computing a least-squares solution to a system of linear equations, each linear equation representing a transformation between measured accelerations, measured by one of the reference accelerometers, and unknown object accelerations.

As mentioned above, in some embodiments, the process receives information indicative of a set of spatial relationships between the transducers of the first subset; and the process computes, from the received information and from the received sensor signals, the spatial configuration of the transducers of the first subset. The information about the spatial relationship between the transducers of the first subset may include the distances between respective pairs of transducers of the first subset. Alternatively or additionally, the information about the spatial relationship between the transducers of the first subset may include a combination of relative distances and orientations or another combination of spatial parameters.

Computing the spatial configurations of the transducers of the first subset may comprise:

defining a first set of sensor signals from the received sensor signals from the first subset of transducers and a second set of sensor signals from said received sensor signals from the first subset of transducers;

computing estimates of the sensor signals of the second set of sensor signals from the sensor signals of the first of sensor signals and from the received information indicative if the spatial relationships between the transducers of the first subset, the estimates of the sensor signals depending on estimated spatial configurations of the transducers of the first subset; and adjusting the estimated spatial configurations so as to reduce, in particular minimize, an error between the computed estimates and the first set of sensor signals.

Accordingly, the spatial configurations of the transducers of the first set may be computed from a minimization problem indicative of how well the computed spatial configurations account for a second set of the received sensor signals, given a first set of the received sensor signals. In some embodiments, the computation of the spatial configurations of the transducers of the first subset may be further improved by mounting the transducers of the first subset with one axis pointing along a known direction, e.g. along the direction of gravity.

Generally, some embodiments of the method described herein may be performed in respect of a target object that is suspended or otherwise supported so as to allow movement of the target object in all six degrees of freedom.

Other embodiments of the method disclosed herein may be performed in respect of a deformable target object whose motion is restricted (e.g. along one or more degrees of freedom) by an object support. To this end, some embodiments of the method comprise:

computing time-dependent acceleration coefficients of the target object from the spatial configurations of the transducers of the first subset and from the received sensor signals.

computing, from the computed time-dependent acceleration coefficients and from the received sensor signals, the spatial configuration of the transducers of the second subset, e.g. by minimizing a fit error indicative of a difference between estimated sensor signals and the received sensor signals.

The time-dependent acceleration coefficients may be coefficients associated with modal coordinates of the target objects. In this case, the procedure for computing the coefficients may be similar to e.g. obtaining modal coordinates in modal decomposition. Alternatively, the time-dependent acceleration coefficients may be coefficients of another expansion based on a suitable set of basis functions. A suitable set of basis functions should preferably satisfy a set of boundary conditions, e.g. so-called essential boundary conditions, and be mutually orthogonal.

It is noted that features of the computer-implemented methods described above and in the following may be implemented at least in part in software or firmware and carried out on a data processing system or other processing means caused by the execution of program code means such as computer-executable instructions. Here and in the following, the term processing means comprises any circuit and/or device suitably adapted to perform the above functions. In particular, the above term comprises general- or special-purpose programmable microprocessors, Digital Signal Processors (DSP), Application Specific Integrated Circuits (ASIC), Programmable Logic Arrays (PLA), Field Programmable Gate Arrays (FPGA), Graphical Processing Units (GPU), special purpose electronic circuits, etc., or a combination thereof.

The present disclosure relates to different aspects, including the method described above and in the following, further methods, systems, devices and product means, each yielding one or more of the benefits and advantages described in connection with one or more of the other aspects, and each having one or more embodiments corresponding to the embodiments described in connection with one or more of the other aspects described herein and/or as disclosed in the appended claims.

In particular, another aspect disclosed herein relates to embodiments of a computer-implemented measurement process comprising:
   determining spatial configurations of a plurality of transducers attached to a target object by performing the steps of the method according to the first aspect described above and in the following;
   receiving further sensor signals from the plurality of transducers, the received further sensor signals being indicative of respective movements of the respective transducers during an induced movement of the target object;
   performing structural analysis calculations based on the received further sensor signals.

The further sensor signals may be obtained based on movements suitable for performing the intended structural analysis calculations. Generally, the further sensor signals may be indicative of movements of the respective transducers during a further induced movement of the target object different from the induced movement from which the spatial configurations of the transducers has been determined. The further induced movement may include flexural movements in addition or alternative to rigid body movements. Depending on the intended structural analysis to be performed the further induced movement may or may not include rigid-body movements along all six degrees of freedom.

Yet another aspect disclosed herein relates to embodiments of a method of determining spatial configurations of a plurality of transducers attached to a target object; the plurality of transducers comprising a first subset of transducers and a second subset of transducers; the method comprising:
   inducing movement of the target object;
   receiving sensor signals from the first and the second subset of transducers, the received sensor signals being indicative of respective movements of the respective transducers;
   obtaining spatial configurations of the transducers of the first subset;
   determining spatial configurations of the transducers of the second subset from the received sensor signals and the obtained spatial configurations of the transducers of the first subset.

In some embodiments, the spatial configurations of the transducers of the first subset may be obtained prior to inducing the movement of the target object and/or prior to receiving the sensor signals. However, it will be appreciated that, in embodiments where the spatial configurations of the transducers of the first subset are determined based on the received sensor signals, the spatial configurations of the transducers of the first subset are obtained after receipt of said sensor signals.

Inducing movement of the target object may comprise exerting one or more forces onto the target object, e.g. by manually swinging the target object and/or by impacting the target object with an excitation hammer. In some embodiments, the movement should include components along all available degrees of freedom. For a target object that can move along all six degrees of freedom, the induced movement should include components along three orthogonal directions and rotational components around three linearly independent axes. To this end, the target object may be suspended from elastic bands, supported on air cushions or otherwise supported such that the object may perform at least small movements along three orthogonal directions and at least small rotations around three linearly independent axes. In other embodiments, the target object may be supported such that its movement is constrained along one or more degrees of freedom, as will be described in greater detail below.

Yet another aspect disclosed herein relates to embodiments of a measurement process comprising:
   determining spatial configurations of a plurality of transducers attached to a target object by performing the steps of the method of determining spatial configurations of a plurality of transducers attached to a target object described above and in the following.
   inducing further movement of the target object;
   receiving further sensor signals from the first and the second subset of transducers, the received further sensor signals being indicative of respective movements of the respective transducers during said induced further movement;
   performing structural analysis calculations based on the received further sensor signals.

In particular, while it may be advantageous to avoid or at least suppress flexural modes for the purpose of determining the spatial configurations of the transducers, the induced further movement based on which the structural analysis is performed may also include significant flexural movements which do not need to be suppressed but which may, in fact, be of interest for the purpose of the structural analysis.

Yet another aspect disclosed herein relates to embodiments of a computer program configured to cause a data processing system to perform the steps of the computer-implemented method described above and in the following. A computer program may comprise program code means adapted to cause a data processing system to perform the steps of the computer-implemented method disclosed above and in the following when the program code means are executed on the data processing system. The computer program may be stored on a computer-readable storage medium or embodied as a data signal. The storage medium may comprise any suitable circuitry or device for storing data, such as a RAM, a ROM, an EPROM, EEPROM, flash memory, magnetic or optical storage device, such as a CD ROM, a DVD, a hard disk, and/or the like.

Yet another aspect disclosed herein relates to embodiments of a measurement system comprising a data processing system configured to perform the steps of the computer-implemented method described herein. The measurement system may further comprise:

a plurality of input channels configured to be coupled, via respective wireless or wired signal connections, to respective transducer output signals of a plurality of transducers attached to a target object;

a data input interface configured for receipt of respective spatial coordinate data of the transducers of the first subset or at least of information about spatial relationships between the transducers of the first subset, e.g. by manual data entry or from another device via a wireless or wired data communication link.

The measurement system may comprise a display showing the determined spatial configurations of the plurality of transducers coupled to the plurality of signal input channels.

Yet another aspect disclosed herein relates to embodiments of a measurement assembly comprising a plurality of transducers mountable at a plurality of predetermined measurement locations distributed across a target object. The measurement assembly further comprises a measurement system as described above and in the following.

BRIEF DESCRIPTION OF THE DRAWINGS

The above and other aspects will be apparent and elucidated from the embodiments described in the following with reference to the drawing in which:

FIG. 1A shows a schematic block diagram of a measurement assembly, FIG. 1B shows a schematic view of a transducer of the measurement assembly and FIG. 1C illustrates examples of coordinate systems as used for the purpose of the present description.

DETAILED DESCRIPTION

Figure 1A:
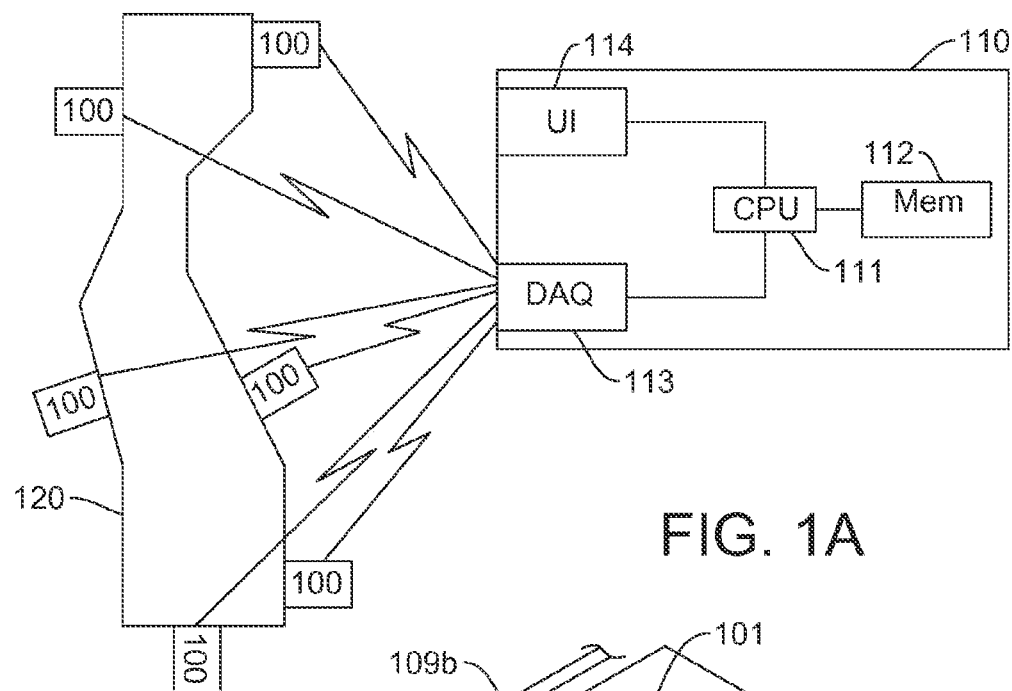
FIGS. 1A-C schematically illustrate an example of a measurement assembly as disclosed herein. In particular.
Figure 1B:
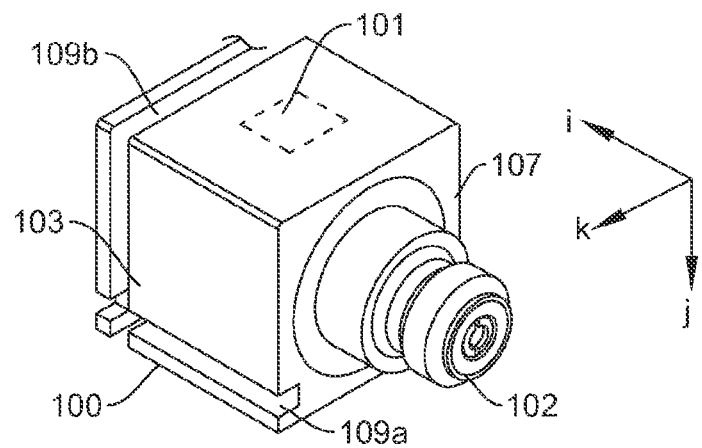
Figure 1C:
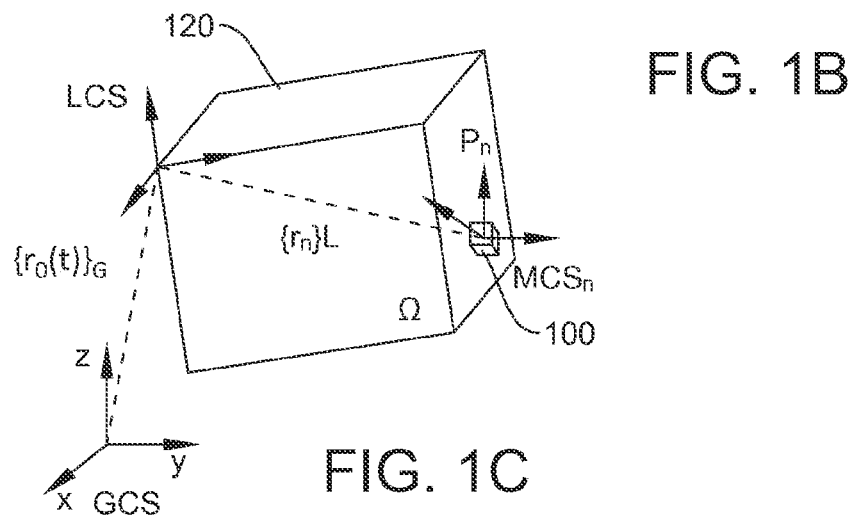

FIGS. 1A-C schematically illustrate an example of a measurement assembly as disclosed herein. In particular, FIG. 1A shows a schematic block diagram of a measurement assembly, FIG. 1B shows a schematic view of a transducer of the measurement assembly and FIG. 1C illustrates examples of coordinate systems as used for the purpose of the present description.

The measurement assembly comprises a measurement system 110 and a plurality of triaxial accelerometers 100 attached to a target object 120 and communicatively coupled to the measurement system 110.

The triaxial accelerometers 100 may for example comprise a triaxial piezoelectric accelerometer of types 4524, 4524-B or 4504 all manufactured by Brüel and Kjær Sound and Vibration Measurement, Nærum, Denmark. The skilled person will understand that other types of transducers, e.g. other types of accelerometers, may be used in alternative embodiments. For example, other types of single-axis or multiple-axis accelerometers from numerous other manufacturers may of course in the alternative be used to implement the present invention. Depending on certain constructional details of the accelerometer, one or more piezoelectric transducer elements 101 may be mounted inside the transducer housing 107, the one or more transducer elements responding to acceleration in a particular direction of three orthogonal spatial directions relative to the accelerometer, (for the purpose of the present description designated i, j, k directions), by producing a sensor signal, e.g. a voltage or current proportional to the acceleration in that particular direction. The directions i, j, k thus define a measurement coordinate system of the accelerometer. Various types of electronic signal conditioning circuitry and/or memory devices may likewise be mounted inside the transducer housing 107 on a suitable carrier such as low-noise preamplifiers, filters, A/D converters, power supplies etc. The electronic signal conditioning circuitry may be coupled to respective output terminals of the one more piezoelectric transducer elements to provide a low-impedance and possibly frequency shaped output signal of the accelerometer 100 for each sensitivity direction. The accelerometer housing 107 may comprise a metallic composition or material such as titanium to protect the transducer element(s) against various harmful environmental pollutants e.g. humidity, mechanical shock, dust, light and heat etc. The metallic accelerometer housing 107 may also be useful for EMI shielding purposes. The accelerometer housing 107 comprises a number of optional slots 109a, 109b which support mounting clips for attachment or fitting of the accelerometer 100 to a number of different target objects. A lower substantially plane outer housing surface (hidden from view arranged oppositely to the outer housing surface 101) of the accelerometer housing 107 is brought directly or indirectly (for example via a suitable adhesive agent or adhesive layer) in physical contact with the target object. The lower substantially plane outer housing surface of the accelerometer housing 107 therefore acts a joining or coupling surface to the target object.

The triaxial accelerometer 100 further comprises an electrical connector 102 which may comprise a 4-pin connector comprising a common ground terminal and three separate output signal terminals carrying the accelerometer i, j, k component output signals, respectively, representing the corresponding first, second and third orthogonal axes of sensitivity of the transducer element(s) of the triaxial accelerometer 100.

The i component output signal indicates the acceleration of the accelerometer 100 in the predefined i direction of the accelerometer protruding orthogonally through the first plane outer housing surface 101. The same applies for the j and k component output signals indicating acceleration along the j-axis and k-axis, respectively, to provide a true tri-axial acceleration measurement of vibration of the relevant target object. The target object 120 may, for example, comprise an automotive body, an aircraft structure, a train structure, a wind turbine blade, a satellite structure, an engine, a transmission, etc. or parts thereof. The electrical connector 102 may be used for coupling the i, j and k component output signals to the measurement system 110 via a suitable cable, e.g. low-noise shielded cable. The skilled person will understand that a practical measurement set-up may include numerous, e.g. more than 20, or even more than 100, individual triaxial accelerometers 100 coupled to the measurement system via suitable electrical cabling.

The measurement system 110 may comprise a suitable accelerometer instrumentation system in combination with various types of data acquisition software executed on a personal computer or other computing hardware platform. In particular, the measurement system may comprise data acquisition interface 113, a data processing unit 111, a memory 112 or other data storage device and a user interface 114.

The data acquisition interface 113 may include connectors to allow each of the numerous triaxial accelerometers to be coupled to a particular measurement channel of the measurement system.

The data processing unit 111 may e.g. be a suitably programmed central processing unit of a computer or other data processing system. The data processing unit 111 may further be configured to execute a structural analysis software application that performs structural analysis calculations with respect to the target object and based on sensor signals received from the accelerometers 100.

The user interface 114 may include a display configured for graphically depicting status and identifiers of each of the measurement channels as well as identification and status information of each accelerometer for example by serial number. The display may further allow display of a digital 3D model of the target object indicating the determined positions and orientations of the accelerometers.

The measurement system associates or links the determined spatial 6-dimensional position and orientation data of each of the triaxial accelerometers 100 and, optionally, their serial numbers and or other information pertaining to the respective accelerometers with the particular measurement channels connected to respective ones of the i, j, k output signals of the respective accelerometers (through the 4 pin connectors 102) representing the i, j, k components, respectively, of acceleration of the tri-axial accelerometers 100 on the target object. It will be appreciated that the measurement system may include multiple separate components. The components may be communicatively coupled with each other so as to allow data transfer. For example, the measurement system may include a data acquisition system configured to record sensor signals from the transducers and a data processing system configured to analyse the recorded sensor signals.

For the purpose of the following description of some embodiments of a process for determining the spatial configurations of the transducers relative to the target object, the target object 120 may be considered as a rigid body Ω that can move unrestrictedly in a 3D space. The position and the orientation of the body is defined in the inertial global coordinate system (GCS). Let us define a local coordinate system (LCS) fixed on the body. Let us consider N tri-axial accelerometers 100 that are attached to the body at points $P_n$, and their coordinates in the LCS are $\{r_{n,x}, r_{n,y}, r_{n,z}\}_L^T = \{r_n\}_L$. For ease of illustration, in FIG. 1C only a single accelerometer is shown explicitly; it will be appreciated that the number N of accelerometers will typically be larger than 1, in particular larger than 3 and often larger than 10 or even larger than 100.

Each accelerometer 100 measures the proper acceleration relative to the (inertial) GCS; the acceleration vector is provided via its three scalar components measured along the measurement axes of the accelerometer. Let us then define N measurement coordinate systems (MCS), associated with the measurement axes of each accelerometer. The position and orientation of the MCSs are fixed in LCS.

As the LCS is fixed on the target object, the position and orientation of the LCS fully characterize the position and the orientation of the target object when the target object behaves as a rigid body. At any time t, vector $\{C(t)\}_G \in \mathbb{R}^{6 \times 1}$ given in GCS, $$\{C(t)\}_G = \{\{r_0(t)\}_G^T; \theta_1(t); \theta_2(t); \theta_3(t)\} T_G \quad (1)$$

completely describes the position and the orientation of the LCS in GCS, i.e. this vector describes the spatial configuration of the local coordinate system associated with the target object. Here $\{r_0(t)\}_G = \{x_0(t), y_0(t), z_0(t)\}_G^T$ is the radius vector of LCS's origin and $\theta_1(t); \theta_2(t); \theta_3(t)$ are three Euler angles, defining the consecutive rotations that bring the GCS to the LCS.

Different formulations of Euler angles do exist, in the document we use Tait-Bryan z-y'-x" convention (also known as nautical or Cardan angles: yaw, pitch and roll). Let the coordinates of a point P in GCS are $\{r\}_G$ and in LCS are $\{r_L\}$, and the GCS and LCS origins coincide. Then the coordinates $\{r\}_L$ can be obtained as three consecutive rotations, first around z axis of GCS by $\theta_1$, then about the new y axis by $\theta_2$ and finally about the new x axis by $\theta_3$:

$$\{r\}_L = \begin{bmatrix} 1 & 0 & 0 \\ 0 & \cos\theta_3 & \sin\theta_3 \\ 0 & -\sin\theta_3 & \cos\theta_3 \end{bmatrix} \begin{bmatrix} \cos\theta_2 & 0 & -\sin\theta_2 \\ 0 & 1 & 0 \\ \sin\theta_2 & 0 & \cos\theta_2 \end{bmatrix} \begin{bmatrix} \cos\theta_1 & \sin\theta_1 & 0 \\ -\sin\theta_1 & \cos\theta_1 & 0 \\ 0 & 0 & 1 \end{bmatrix} \quad (2)$$

$$\{r\}_G = [R_x(\theta_3)][R_y(\theta_2)][R_z(\theta_1)]\{r\}_G = [R_{GL}(\theta_1, \theta_2, \theta_3)]\{r\}_G$$

where each rotation is represented by a pre-multiplication of the radius vector by the rotation matrix. The three rotation matrices combined yield a single rotation matrix $[R_{GL}]$. The backward coordinate conversion from LCS to GCS can be presented as $\{r\}_G = [R_{LG}]\{r\}_L$, where $$[R_{LG}] = [R_{GL}]^{-1} = [R_{GL}]^T \quad (3)$$

The second equality here is because rotation matrices are orthogonal matrices.

Utilizing the rotation matrix, the coordinates of the accelerometer located in point $P_n$ in GCS can be presented as a sum of its translation $\{r_0(t)\}_G = \{x_0(t), y_0(t), z_0(t)\}_G^T$ and rotation in GCS, both time dependent, $$\{r_n(t)\}_G = \{r_0(t)\}_G + [R_{LG}(t)]\{r_n\}_L \quad (4)$$

The acceleration vector measured in this point will be $$\{\ddot{r}_n(t)\}_G = \{\ddot{r}_0(t)\}_G + [\ddot{R}_{LG}(t)]\{r_n\}_L \quad (5)$$

The triaxial accelerometer attached to point $P_n$ provides three signals $a_{n,i}(t)$, $a_{n,j}(t)$ and $a_{n,k}(t)$ which correspond to the acceleration vector (5) projected to the axes of the MCS associated with the accelerometer:

$$a_{n,i}(t)=\{i_n(t)\}_G^T\{\ddot{r}_n(t)\}_G,$$

$$a_{n,j}(t)=\{j_n(t)\}_G^T\{\ddot{r}_n(t)\}_G,$$

$$a_{n,k}(t)=\{k_n(t)\}_G^T\{\ddot{r}_n(t)\}_G, \quad (6)$$

where $\{i_n(t)\}_G$, $\{j_n(t)\}_G$ and $\{k_n(t)\}_G$ are the orts of the MCS presented in GCS. Orts' coordinates in GCS can be obtained as a series of consecutive rotations of the MCS first to LCS and then to GCS:

$$\{i_n(t)\}_G=[R_{LG}(t)][R_{ML,n}]\{1,0,0\}^T,$$

$$\{j_n(t)\}_G=[R_{LG}(t)][R_{ML,n}]\{0,1,0\}^T,$$

$$\{k_n(t)\}_G=[R_{LG}(t)][R_{ML,n}]\{0,0,1\}^T, \quad (7)$$

where $[R_{ML,n}]=[k_{LM,n}]^{-1}=[R_{LM,n}]^T$, and $[R_{LM,n}]$ is a matrix that represents the rotation of the LCS to MCS associated with the accelerometer mounted at point $P_n$. It can be constructed in similar way as (2), using a set of the Euler angles $\phi_{n,1}$, $\phi_{n,2}$ and $\phi_{n,3}$:

$$[R_{LM,n}] = \begin{pmatrix} c_{1,n}c_{2,n} & c_{2,n}s_{1,n} & -s_{2,n} \\ -c_{3,n}s_{1,n}+c_{1,n}s_{2,n}s_{3,n} & c_{1,n}c_{3,n}+s_{1,n}s_{2,n}s_{3,n} & c_{2,n}s_{3,n} \\ c_{1,n}c_{3,n}s_{2,n}+s_{1,n}s_{3,n} & c_{3,n}s_{1,n}s_{2,n}-c_{1,n}s_{3,n} & c_{2,n}c_{3,n} \end{pmatrix} \quad (8)$$

where $c_{l,n}=\cos\phi_{l,n}$ and $s_{l,n}=\sin\phi_{l,n}$, $l=1\ldots 3$.
Substituting (5) and (7) into (6) and rewriting in matrix form, $$\begin{Bmatrix} a_{n,i}(t) \\ a_{n,j}(t) \\ a_{n,k}(t) \end{Bmatrix} = [R_{ML,n}]^T[R_{LG}(t)]^T(\{\ddot{r}_0(t)\}_G + [\ddot{R}_{LG}(t)]\{r_n\}_L) \quad (9)$$

Without loss of generality, we can assume that initially, when the body is at rest, LCS coincides with GCS (otherwise it is possible to apply an extra translation and rotation to move the GCS to the initial location of the LCS and then apply to backward transformation to the results): $[R_{LG}(0)]=[E]$. Now let us assume that the body's movements w.r.t. its initial position are small:

$$x_0(t)=\in x_0(t), y_0(t)=\in y_0(t), z_0(t)=\in z_0(t);$$

$$\theta_1(t)=\in\theta_1(t), \theta_2(t)=\in\theta_2(t), \theta_3(t)=\in\theta_3(t). \quad (10)$$

Here $\in$ is used as a book-keeping device to indicate the order of magnitude of the attached terms. Substituting (2) to (9) and differentiating twice, the result can be expanded to Taylor series, resulting in $$\begin{Bmatrix} a_{n,i}(t) \\ a_{n,j}(t) \\ a_{n,k}(t) \end{Bmatrix} = \quad (11)$$

$$[R_{ML,n}]^T\left(\begin{Bmatrix} \ddot{x}_0(t) \\ \ddot{y}_0(t) \\ \ddot{z}_0(t) \end{Bmatrix} + \begin{bmatrix} 0 & -\ddot{\theta}_1(t) & \ddot{\theta}_2(t) \\ \ddot{\theta}_1(t) & 0 & -\ddot{\theta}_3(t) \\ -\ddot{\theta}_2(t) & \ddot{\theta}_3(t) & 0 \end{bmatrix}\begin{Bmatrix} r_{n,x} \\ r_{n,y} \\ r_{n,z} \end{Bmatrix}\right) + O(\epsilon^2)$$

Omitting the terms with the order of magnitude greater than or equal to $\in^2$, and re-arranging $$\begin{Bmatrix} a_{n,i}(t) \\ a_{n,j}(t) \\ a_{n,k}(t) \end{Bmatrix} \approx [R_{ML,n}]^T \begin{bmatrix} 1 & 0 & 0 & -r_{n,y} & r_{n,z} & 0 \\ 0 & 1 & 0 & r_{n,x} & 0 & -r_{n,z} \\ 0 & 0 & 1 & 0 & -r_{n,x} & r_{n,y} \end{bmatrix} \quad (12)$$

$$\{\ddot{x}_0(t), \ddot{y}_0(t), \ddot{z}_0(t), \ddot{\theta}_1(t), \ddot{\theta}_2(t), \ddot{\theta}_3(t)\}^T =$$

$$[R_{ML,n}]^T \begin{bmatrix} 1 & 0 & 0 & -r_{n,y} & r_{n,z} & 0 \\ 0 & 1 & 0 & r_{n,x} & 0 & -r_{n,z} \\ 0 & 0 & 1 & 0 & -r_{n,x} & r_{n,y} \end{bmatrix}\{\ddot{C}(t)\}.$$

The two matrices in (12) can be combined into a time-invariant 3×6 matrix $[\beta_n]=[\beta_n(r_{n,x}, r_{n,y}, r_{n,z}, \phi_{n,1}, \phi_{n,2}, \phi_{n,3})]$, whose elements are nonlinear functions of the coordinates of the point $P_n$ given in the LCS, and the orientation of the accelerometer, presented using three Euler angles providing the rotation from the LCS to MCS.

$$[\beta_n(r_{n,x}, r_{n,y}, r_{n,z}, \phi_{n,1}, \phi_{n,2}, \phi_{n,3})] = \quad (13)$$

$$[R_{ML,n}(\phi_{n,1}, \phi_{n,2}, \phi_{n,3})]^T \begin{bmatrix} 1 & 0 & 0 & -r_{n,y} & r_{n,z} & 0 \\ 0 & 1 & 0 & r_{n,x} & 0 & -r_{n,z} \\ 0 & 0 & 1 & 0 & -r_{n,x} & r_{n,y} \end{bmatrix}.$$

Note, none of these parameters are assumed to be small. Summarizing, in the case of small motion, the signals measured by the n-th triaxial accelerometer can be approximated as a product of the matrix $[\beta_n]$ and vector $\{C(t)\}$, differentiated twice w.r.t. time:

$$\begin{Bmatrix} a_{n,i}(t) \\ a_{n,j}(t) \\ a_{n,k}(t) \end{Bmatrix} = [\beta_n(r_{n,x}, r_{n,y}, r_{n,z}, \phi_{n,1}, \phi_{n,2}, \phi_{n,3})]\{\ddot{C}(t)\} \quad (14)$$

For shorter representation, let us introduce vector $\{a_n(t)\}=\{a_{n,i}(t), a_{n,j}(t), a_{n,k}(t)\}^T$, thus expression (14) compacts to:

$$\{a_n(t)\}=[\beta_n]\{\ddot{C}(t)\} \quad (15)$$

Hence, generally, the measured acceleration by an accelerator may be computed from the transducer transmissibility matrix associated with said transducer and from the spatial configuration, differentiated twice with respect to time, of a local coordinate system of the target object. The transducer transmissibility matrix represents the spatial configuration of the measurement coordinate system of said accelerometer relative to the local coordinate system of the target object.

Figure 2:
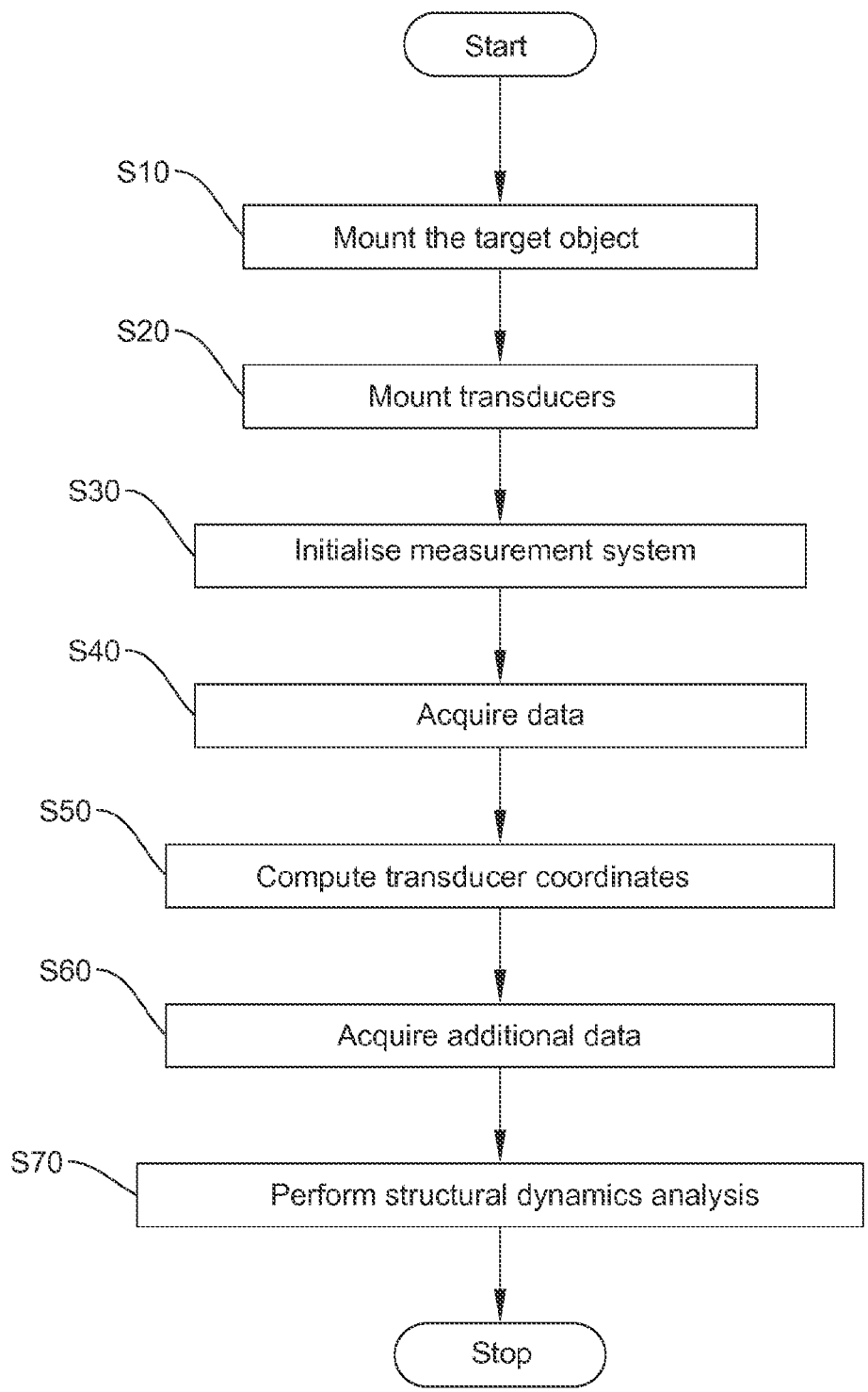
FIG. 2 illustrates a flow diagram of an example of a measurement process disclosed herein.

FIG. 2 illustrates a flow diagram of an example of a measurement process disclosed herein. The measurement process may e.g. be performed using an assembly as described in connection with FIGS. 1A-C.

In initial step S10, the target object on which structural analysis is to be performed, e.g. object 120 shown in FIGS. 1A and 1C, is mounted at a test site. It will be appreciated that the type of mounting may depend on the characteristics of the target object, such as its volume, mass and structural integrity and on the objectives of the measurements to be taken, e.g. the type of structural analysis to be performed. For example, when the target object is mounted on rubber bungees and/or air pillows, its rigid body motion in any direction remains substantially unrestricted. It will be appreciated, however, that in some embodiments, a mounting that partly restricts the rigid body motion of the target object may be desirable.

In subsequent step S20, a plurality of transducers, such as accelerometers, e.g. triaxial accelerometers as shown in FIG. 1B, are mounted to the target object such that they can record movements of the target object. For example, the transducers may be distributed across and attached to the surface of the target object, e.g. by suitable mounting elements, an adhesive or the like. The transducers are mounted such that the spatial configurations, i.e. the positions and orientations, of a first subset of the transducers relative to the target object are known or manually determined, e.g. measured. For example, the transducers of the first subset may be positioned at easily recognisable positions of the target object and aligned with easily recognisable directional features of the target objects, e.g. at respective edges, corners, or similar surface features. The positions of the reference transducers may be provided as their coordinates w.r.t. the LCS. The orientations of the reference transducers relative to the LCS may be provided using any suitable convention for defining orientations. For example, they may be provided as three Tait-Bryan angles following z-y'-x" convention. The angles correspond to consecutive rotations from LCS to MCSs of the reference transducers. Generally, it may be preferable to position the reference transducers such that the area surrounded by the reference transducers covers most of the target object. As will be described in greater detail below, in some embodiments, only information about spatial relationships between the reference transducers (e.g. their mutual distances from each other) may need to be entered rather than their complete spatial configurations.

When the transducers comprise triaxial accelerometers, the first subset preferably comprises at least three triaxal accelerometers which are not positioned along a straight line. For the purpose of the present description, the accelerometers of the first subset will also be referred to as reference accelerometers.

In step S30 the measurement system, e.g. measurement system 110 of the embodiment of FIG. 1, is initialised. To this end the transducers are communicatively connected to the data acquisition interface of the measurement system. Moreover, the known spatial configurations of the reference transducers (or at least information about their spatial relationships) may be entered into the measurement system. Also, a digital model of the target object, e.g. a CAD model and FE model or the like, may be loaded into a memory of the measurement system. Finally, one or more operational parameters of the signal processing to be performed by the measurement system may be set, e.g. adjustable attenuations, filter parameters and/or the like. For example a value of a high-pass filter to be applied to the acquired sensor signals may initially be set to a small value, e.g. less than 1 Hz, such as 0.7 Hz. It will be appreciated that suitable values may depend on the specific data acquisition system and/or the characteristics of the target object to be tested.

In some embodiments, some of the parameters may be set based on initial measurements. In particular, for the purpose of determining the spatial configurations of the transducers other than the reference transducers it may be desirable to filter the sensor signals so as to suppress frequencies associated to flexural modes of movement of the target object while maintaining the frequencies associated with rigid body modes of the movement of the target object.

To this end, the target object may be excited, e.g. using a modal hammer, a hammer-like object, or in another suitable manner. The measurement system may acquire sensor signals from the transducers responsive to the excitation, e.g. in response to the impact of the modal hammer or hammer-like object. This step may be repeated for multiple excitations, e.g. at respective excitation points. The process may compute a frequency spectrum or frequency response function for all transducers and estimate the natural frequency of the lowest flexural mode and the natural frequency of the highest rigid body mode. The process may then estimate the cut-off frequency of a low-pass-filter to be applied to the subsequent sensor signals for the purpose of determining the spatial configurations of the transducers. In particular, the cut-off frequency may be selected such that the low-pass-filer will keep the information regarding rigid body motion but exclude the flexural motion of the target object. Moreover, the data acquisition part of the measurement system may then be configured to conduct recordings with a sampling frequency that is greater than a predetermined threshold. The threshold may be selected depending on the determined cut-off frequency of the low-pass filter, e.g. 2.56 times the cut-off frequency of the low-pass filter.

In step S40, the process acquires sensor signals from the transducers. To this end, movement of the target object, in particular rigid body movement, may be induced and sensor signals responsive to the induced movement may be acquired.

In particular, the data acquisition may be initiated and the target object may be caused to swing in such a manner that it experiences all 6 degrees of freedom (3 translatory and 3 rotational degrees of freedom). This may be done manually, e.g. by swinging the suspended object by hand or by using a heavy hammer with very soft tip. As the resonant frequency of the rigid body modes is typically very low, it might be difficult to excite the rigid body modes to have sufficient signal to noise ratio in the acceleration signals. Therefore, it may be advantageous to record sufficient data based on multiple swings in each of the 6 degrees of freedom, e.g. based on at least 20-40 swings in each of the 6 directions. The acquired sensor signals may be represented as a time series of measurements. In some embodiments, where only spatial relationships of the transducers of the first subset have initially been entered, this step may be followed by a computation of the complete spatial configurations of the transducers of the first set.

In subsequent step S50, the process computes the spatial configurations of the transducers other than the reference transducers from the known spatial configurations of the reference transducers and from the acquired sensor signals. An example of a computational process for computing the spatial configurations of the transducers will be described in detail below with reference to FIG. 3. As will become apparent from the below description, as part of the computation, the process may detect to what extent the acquired data is suitable or sufficient to compute the spatial configurations of all transducers with a desired accuracy. The process may alert the user if such computation is not possible. The user may then repeat the data acquisition, e.g. by acquiring more data so as to improve the signal-to-noise ratio, by re-adjusting some of the parameters, e.g. the cut-off frequency of the low-pass filter, or by moving the accelerometers to other locations (keeping the reference accelerometers in place) and repeating the measurements.

Once the spatial configurations of all transducers are determined, the process can proceed with the actual data acquisition for the intended structural analysis. To this end additional data may be acquired in step S60. In particular, the target object may be moved so as to excite both flexural and rigid body modes and further sensor signals from all transducers may be acquired. During this step, the previous low-pass filtering to suppress flexural modes may be omitted.

In step S70, the process may perform the desired structural analysis computations based on the acquired additional data and based on the known and determined spatial configurations of all transducers. Generally, the term structural analysis is intended to encompass any computational method based on the recorded transducer signal that results in information about the behaviour of the target object when subjected to force and, in particular subject to dynamic loading. Examples of structural analysis may include an analysis of dynamic displacements, time history, and modal analysis, vibrational analysis, etc. In some embodiments the structural analysis may include a finite element analysis, e.g. so as to calculate mode shapes and frequencies.

Figure 3:
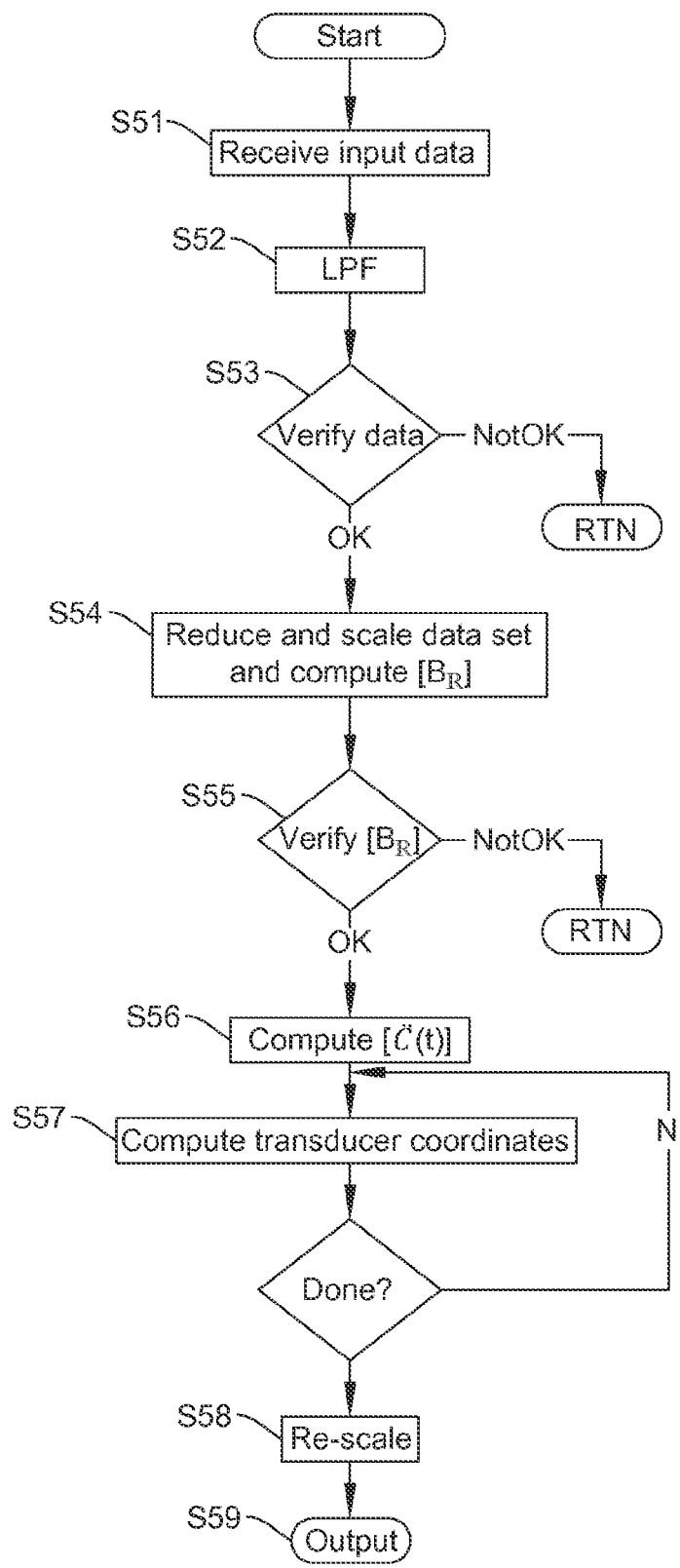
FIG. 3 illustrates a flow diagram of an example of a computer-implemented process for determining the spatial configurations of transducers as disclosed herein.

FIG. 3 illustrates a flow diagram of an example of a computer-implemented process for determining the spatial configurations of transducers, in particular of triaxial accelerometers, as disclosed herein. The process may e.g. be performed by the measurement system 110 as described in connection with FIG. 1A.

In initial step S51, the process receives the input data. In particular, the process receives the positions and orientations of the respective reference accelerometers. For example, the positions may be received as the coordinates of the reference accelerometers w.r.t. the LCS. The orientation of each reference accelerometer may be received as three Tait-Bryan angles following z-y'-x'' convention. The angles correspond to consecutive rotations from LCS to MC Ss of the reference accelerometers. The positions and orientations may have been entered manually, determined by another automated procedure or computed based on entered information of spatial relationships between the reference transducers and based on the sensor signals.

The process further receives the sensor signals of all accelerometers that have been recorded in response to an induced motion of the target object, e.g. the recordings acquired in step S40 of the process of FIG. 2. The process may further receive a channel table of the data acquisition interface to which the accelerometers were connected during measurement, and an indication as to which channels correspond to the reference accelerometers, i.e. which channels correspond to the accelerometers of the first subset and which channels correspond to the accelerometers of the second subset.

The process may further receive additional information, such as the cut-off frequency of the low-pass filter as described in connection with step S30 of the process of FIG. 2.

In the subsequent step, the process computes the spatial configurations of the accelerometers of the second subset. Before discussing the individual steps, the overall methodology of the calculation of the position and orientation of the accelerometers of the second subset will be described in more detail:

Let us assume that the first subset of transducers comprises R reference accelerometers from a set $\mathbb{R}$, which we call a reference set. The positions and orientations of all accelerometers of the reference set are known. Stacking expressions (15) for all accelerometers in the set $$\begin{Bmatrix} a_1(t) \\ \cdots \\ a_R(t) \end{Bmatrix} = \begin{bmatrix} [\beta_1] \\ \cdots \\ [\beta_R] \end{bmatrix} \{\ddot{C}(t)\} = [B_{\mathbb{R}}]\{\ddot{C}(t)\} \quad (16)$$

where the matrices $[\beta_r]$, $r=1 \ldots R$ will also be referred to as transducer transmissibility matrix; The transducer transmissibility matrices for the reference accelerometers are known from (13). Each transducer transmissibility matrix associates the sensor signal of the corresponding transducer to the vector of second derivatives of positions and orientations (i.e. of accelerations) of a rigid body representing the target object (i.e. of the local coordinates system LCS associated with the target object). The accelerometer signals $\{a_r(t)\}$ are available for the reference accelerometers. Then vector $\{\ddot{C}(t)\}$ can be estimated as a least squared average of the measured accelerations:

$$\{\ddot{C}(t)\} = [B_{\mathbb{R}}]^\dagger \begin{Bmatrix} a_1(t) \\ \cdots \\ a_R(t) \end{Bmatrix} \quad (17)$$

here symbol † denotes matrix pseudo-inverse.

Matrix $[B_{\mathbb{R}}]$ is constructed from the transducer transmissibility matrices of the reference accelerometers; it has 3R rows and 6 columns. In order for equation (17) to be solvable, the matrix $[B_{\mathbb{R}}]$ should be of a full rank, thus it should have at least 6 rows. However, two triaxial reference accelerometers (R=2) are not enough to construct a full rank $[B_{\mathbb{R}}]$ matrix, and at least three reference accelerometers (R=3) are required (and they shall not be placed on straight line).

Let us assume that the abovementioned condition is fulfilled, and $\{\ddot{C}(t)\}$ can be obtained using (17). Let us consider another set of accelerometers $\mathbb{Q}$, attached to the same body and measuring synchronously with those from the set $\mathbb{R}$. The accelerometers readings are available; however, their positions and orientation are unknown. For each accelerometer $q \in \mathbb{Q}$, its readings are linearly dependent to $\{\ddot{C}(t)\}$, cf (15):

$$\{a_q(t)\} = [\beta_q]\{\ddot{C}(t)\} \quad (18)$$

It follows from (12) that matrix $[\beta_q]$ is a function of $r_{q,x}$, $r_{q,y}$, $r_{q,z}$, $\phi_{q,1}$, $\phi_{q,2}$, $\phi_{q,3}$ and the analytical (nonlinear) expressions are available for each element of this 3×6 matrix. By solving (18) for unknown $r_{q,x}$, $r_{q,y}$, $r_{q,z}$, $\phi_{q,1}$, $\phi_{q,2}$, $\phi_{q,3}$, one can obtain the position and orientation of any accelerometer from the set $\mathbb{Q}$.

Different ways of solving this (nonlinear) problem are possible. In the following two examples of methodologies for solving the non-linear problem are disclosed:

Approach 1:

As mentioned above, matrix $[\beta_q]$ in (18) can be considered as a transmissibility matrix; it can be estimated from measured $\{a_q(t)\}$ and estimated $\{\ddot{C}(t)\}$ using one of the estimators known from multiple input multiple output (MIMO) modal analysis, namely $H_1$, $H_V$ or $H_S$ (see e.g. J. S. Bendat, A. G. Piersol, "Engineering applications of correlation and spectral analysis", John Wiley & Sons, Inc., 1980). For signals sampled at $t_i$, $i=1 \ldots M$, Let us present the accelerometer readings and $\{\ddot{C}(t)\}$ as matrices:

$$\{a_q(t)\} \to \begin{bmatrix} a_x(t_1) & \cdots & a_x(t_M) \\ a_y(t_1) & \cdots & a_y(t_M) \\ a_z(t_1) & \cdots & a_z(t_M) \end{bmatrix} = [a_q(t_i)] \in R^{3 \times M}, \quad (19)$$

-continued $$\{\ddot{C}(t)\} \rightarrow \begin{Bmatrix} \ddot{x}_0(t_1) & \cdots & \ddot{x}_0(t_M) \\ \vdots & \vdots & \vdots \\ \dot{\theta}_3(t_1) & \cdots & \dot{\theta}_3(t_M) \end{Bmatrix} = [\ddot{C}(t_i)] \in R^{6 \times M}$$

thus (17) becomes $$[a_q(t_i)] = [\beta_q][\ddot{C}(t_i)] \quad (20)$$

Following the simplest $H_1$ estimator, $$[\beta_q] = [a_q(t_i)][\ddot{C}(t_i)]^\dagger \quad (21)$$

Equating element-wise $$[\beta_q(r_{q,x}, r_{q,y}, r_{q,z}, \phi_{q,1}, \phi_{q,2}, \phi_{q,3})] = [\hat{\beta}q] \quad (22)$$

one can solve 18 nonlinear equations for 6 unknowns. Since the accelerometer readings are contaminated by noise, this may be formulated as an optimization problem of finding such $r_{q,x}$, $r_{q,y}$, $r_{q,z}$, $\phi_{q,1}$, $\phi_{q,2}$, $\phi_{q,3}$ that produce the best fit of the elements in matrix equation (22), minimizing the elements of $[\epsilon]$ $$[\epsilon] = [\beta_q(r_{q,x}, r_{q,y}, r_{q,z}, \phi_{q,1}, \phi_{q,2}, \phi_{q,3})] - [\hat{\beta}_q] \quad (23)$$

or some of it norms.

Approach 2:

Instead of fitting the 18 elements of the transmissibility matrix, one can fit the measured time histories. Let us consider $$[\hat{a}_q(t_i, \{v_q\})] = [\beta_q(\{v_q\})][\ddot{C}(t_i)] \quad (24)$$

where $[\hat{a}_q(t_i, \{v_q\})]$ is the estimated readings of the accelerometer q computed for a vector of variables $\{v_q\} = \{r_{q,x}, r_{q,y}, r_{q,z}, \phi_{q,1}, \phi_{q,2}, \phi_{q,3}\}^T$. The discrepancy between the measured signals and the estimate is $$\begin{bmatrix} \{\epsilon_x(t_i, \{v_q\})\}^T \\ \{\epsilon_y(t_i, \{v_q\})\}^T \\ \{\epsilon_z(t_i, [v_q])\}^T \end{bmatrix} = [\hat{a}_q(t_i, \{v_q\})] - [a_q(t_i)] \quad (25)$$

and the rows of the left-hand-side matrix can be considered as prediction errors for x-, y- and z measurement axes of the accelerometer. The scalar fit error for each measurement axis can be characterized as a mean squared:

$$E_x(\{v_q\})^2 = \frac{1}{M}\{\epsilon_x(t_i, \{v_q\})\}^T\{\epsilon_x(t_i, \{v_q\})\},$$

$$E_y(\{v_q\})^2 = \frac{1}{M}\{\epsilon_y(t_i, \{v_q\})\}^T\{\epsilon_y(t_i, \{v_q\})\}, \quad (26)$$

$$E_z(\{v_q\})^2 = \frac{1}{M}\{\epsilon_z(t_i, \{v_q\})\}^T\{\epsilon_z(t_i, \{v_q\})\},$$

where the left-hand-side of expressions (26) are positive scalar functions of the vector of variables $\{v\}$, which can be combined into a positive scalar function $$E(\{v_q\})^2 = E_x(\{v_q\})^2 + E_y(\{v_q\})^2 + E_z(\{v_q\})^2. \quad (27)$$

Then the minimization problem can be formulated as:

$$\min_{\{v\}}(E(\{v_q\})^2) \quad (28)$$

subject to $$\{v\}_{min} \leq \{v_q\} \leq \{v\}_{max}$$

The latter presents the possible constraints, for example the position of the accelerometer shall not be outside the target object, and the Euler angles are typically subjected to $$0 \leq \phi_{q,1} \leq 2\pi,$$

$$0 \leq \phi_{q,2} \leq \pi,$$

$$0 \leq \phi_{q,3} \leq 2\pi. \quad (29)$$

Each of the above two approaches may be employed individually as a stand-alone approach. Alternatively, both approaches may be employed in combination. While approach 1 above may converge faster, approach 2 may result in more accurate estimates. Accordingly, in some embodiments approach 1 may be used to compute an initial estimate while approach 2 may be used to refine the approach 1 output.

Generally, the above methodology makes a number of assumptions. In particular, the above methodology assumes that the target object moves as a rigid body, that the displacements of the induced movement are small, and that the target object moves in all six degrees of freedom.

The accuracy of embodiments of the method disclosed herein depends on the degree to which the above assumptions are fulfilled in a real measurement situation.

In the following this will be discussed in more detail.

Figure 4A:
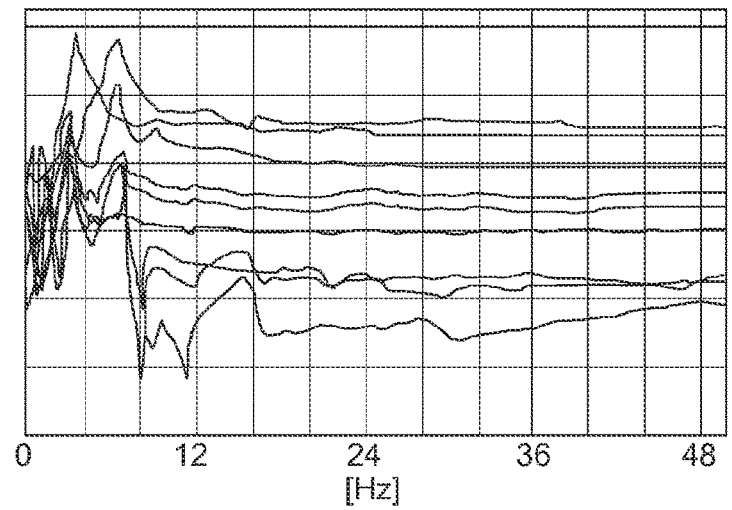
FIGS. 4A-B show measured frequency response functions of am example target object.
Figure 4B:
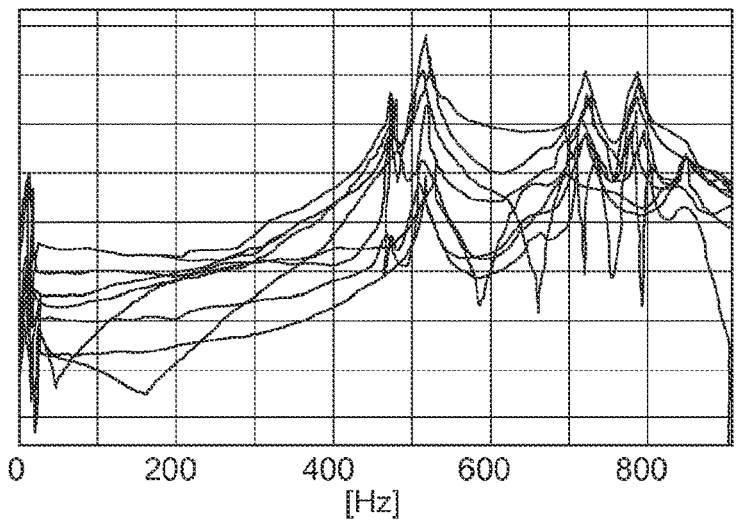

In a typical measurement situation, the target object does not move as an ideal unrestricted rigid body. However, there are many measurement scenarios when a target object is supported by e.g. soft bungees and/or air pillows in order to model the object's dynamics in free-free conditions. This is a typical scenario for experimental modal analysis (EMA), conducted for validation/tuning object's FE model. The choice of the supports' stiffness may be based on the best separation of the rigid body modes' frequencies (defined by the inertia properties of the objects and the stiffness of the supports) and the flexible mode resonances (which depend on the stiffness of the object); a sample frequency response function (FRF) or accelerometer autospectra can be used to check this, e.g. as illustrated by FIGS. 4A-B. FIG. 4A shows the FRF of a target object in the frequency range between 0-900 Hz while FIG. 4B shows an enlarged view of the FRF in the frequency range 0-50 Hz. As can be seen from FIGS. 4A-B, the lowest flexural modes occur at about 462 HZ while the highest rigid body modes occur at around 6.5 HZ. Hence a good separation between the flexural modes and the rigid modes is indeed possible. Accordingly, by applying a low-pass filter and setting its cut-off frequency above the highest rigid body mode and below the lowest flexible mode, one can significantly attenuate the flexible components of the response and fulfil the assumption for rigid-body motion.

As regards movement of the target object in all six degrees of freedom, to find all six unknowns solving (18), the matrix $[C(t_i)]$ should be full-rank (i.e. its rank should be equal to six). Expression (17) rewritten for sampled accelerometers' signals, like (19):

$$[\ddot{C}(t_i)] = [B_\mathbb{R}]^\dagger [a_\mathbb{R}(t_i)]. \quad (30)$$

According to Sylvester's inequality (ref. to Matrix Cookbook)

$$\text{rank}([\ddot{C}(t_i)]) \leq \min(\text{rank}([{}_B B_{\mathbb{R}}]^\dagger), \text{rank}([a_{\mathbb{R}}(t_i)])) = \min(\text{rank}([B_{\mathbb{R}}), \text{rank}([a_{\mathbb{R}}(t_i)])). \quad (31)$$

The rank of $[BB_{\mathbb{R}}]$ has been already discussed: by locating the reference accelerometers in a proper way, the full rank of this matrix is easily achievable (to recall, it should be three or more reference accelerometers, not mounted along a straight line). And if $[BB_{\mathbb{R}}]$ is full rank, its pseudoinverse is also full rank: rank $([B_R])$=rank $([B_R]t)$=6.

Thus, rank$([a_{\mathbb{R}}(t_i)])$=6 is a necessary condition for full rank of $[\ddot{C}(t_i)]$. To achieve this, the target object should experience the motion in all six degrees of freedom, and a special attention should be paid to exciting the target object in such a way that it experiences motion in all six directions, during the data acquisition.

It is possible to check how this assumption is fulfilled by checking the singular values of $[a_{\mathbb{R}}(t_i)]$ after applying the low pass filter, which will be discussed below.

To obtain expression (11), we assumed that the translational and rotational displacements are small. In practice it has been found, that this assumption is fulfilled when the rotational displacements $\theta$ are small enough to satisfy sin $\theta \approx \theta$, cos $\theta \approx 1$; up to two decimals, this is satisfied if $|\theta| \leq 10°$. In order to have the same magnitude, the translational displacements d should be in the range that $|d/l| \leq 0.17$, where l is some characteristic length of the target object.

On the other hand, it should be noted that some reasonable displacements should be excited that ensure good signal-to-noise ratio of the accelerometer signals, which might be difficult to achieve at very low frequencies.

The inventors have found it sufficient in order to excite the target object when the target object is moved by hand in all six directions or excite it with a relatively heavy hammer with a soft tip. When using a hammer, it has been found helpful to impact the object at many points in random directions. In this way, the structure will experience oscillations about its initial position, which is believed to be a very useful way to fulfil this assumption.

Again referring to FIG. 3, in step S52, the process performs low pass filtering of the received sensor signals using the determined cut-off frequency.

Figure 5:
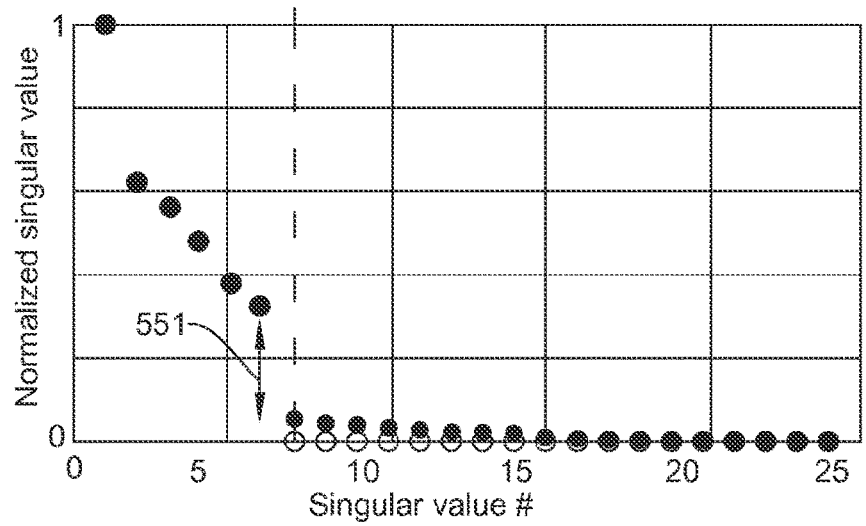
FIG. 5 shows examples of normalized singular values determined for an example movement of a target object.

In step S53, the process verifies whether the induced movements of the target object may be represented as rigid body motions and whether motion occurs in all six degrees of freedom. To this end, the process may compute the singular values of $[a(t_1)]$ in respect of all accelerometers signals and determine whether the difference and/or ratio between singular values #6 and #7 is larger than a predetermined threshold. FIG. 5 shows examples of normalized singular values determined for an example movement of a target object. The gap between singular values #6 and #7 is indicated by arrow 551.

If the induced movement fulfils the above criteria, the process proceeds at step S54. Otherwise the process returns with a suitable error message, e.g. instructing the user to repeat the step of inducing a movement (e.g. to return to step S40 of the process of FIG. 2).

At step S54, the process removes the data corresponding to singular values greater than 6 (e.g. by performing a singular value decomposition followed by a truncation), scales the coordinates such that the biggest distance between references is 1 and computes the matrix $[B_{\mathbb{R}}]$ using expression (16).

At step S55, the process compares the condition number of the computed matrix $[B_{\mathbb{R}}]$ with a predetermined threshold. If the condition number is larger than the threshold, the process returns with a suitable message instructing the user to select a different placement of the reference accelerometers, namely a placement more displaced from a straight line (e.g. to return to step S20 of the process of FIG. 2), and to repeat the data acquisition. Otherwise, the process proceeds at step S56.

At step S56, the process computes the accelerations of the local coordinate system of the target object using expression (17), i.e. the process computes $[\ddot{C}(t)]$. As mentioned above this step may include computing a least-squares solution of a system of linear equations.

At step S57, the process computes the spatial configuration of each of the accelerometers of the second subset i.e. the position and orientation of each non-reference accelerometer. An example of a methodology for computing the spatial configuration of an accelerometer of the second subset will be described in more detail below with reference to FIG. 7.

When the spatial configurations of all reference accelerations have been computed, the process proceeds at step S58 where all coordinates are re-scaled back to the original scaling.

Figure 6A:
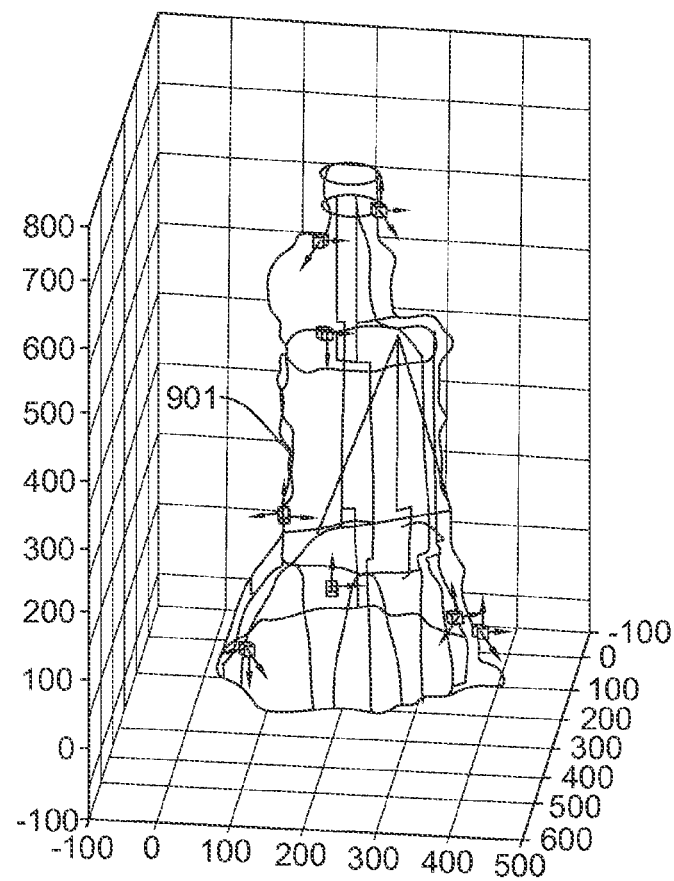
FIGS. 6A-B schematically illustrate a displayed 3D digital model of a target object indicating the determined spatial configurations of respective accelerometers.
Figure 6B:
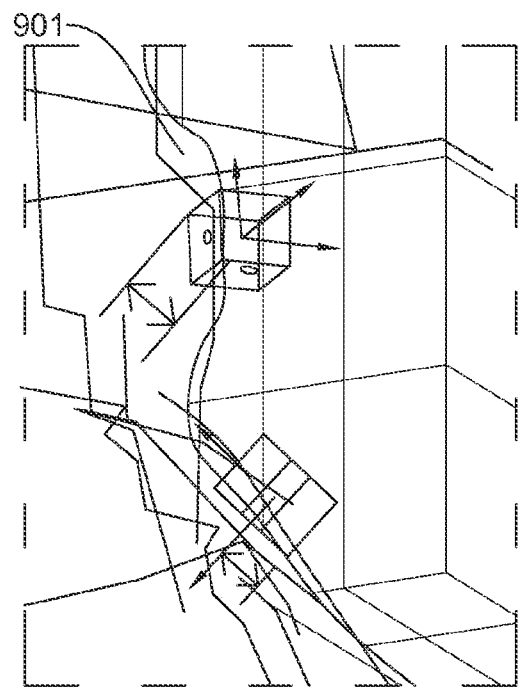

At step S59, the process stores the determined spatial configurations for use during subsequent measurements. The process may also present the results to the user, for example via a graphical user interface, e.g. as illustrated in FIGS. 6A-B. FIG. 6A schematically illustrates a displayed 3D digital model of a target object indicating the determined spatial configurations of respective accelerometers. FIG. 6B shows an enlarged view of a part of the displayed 3D digital model.

Figure 7:
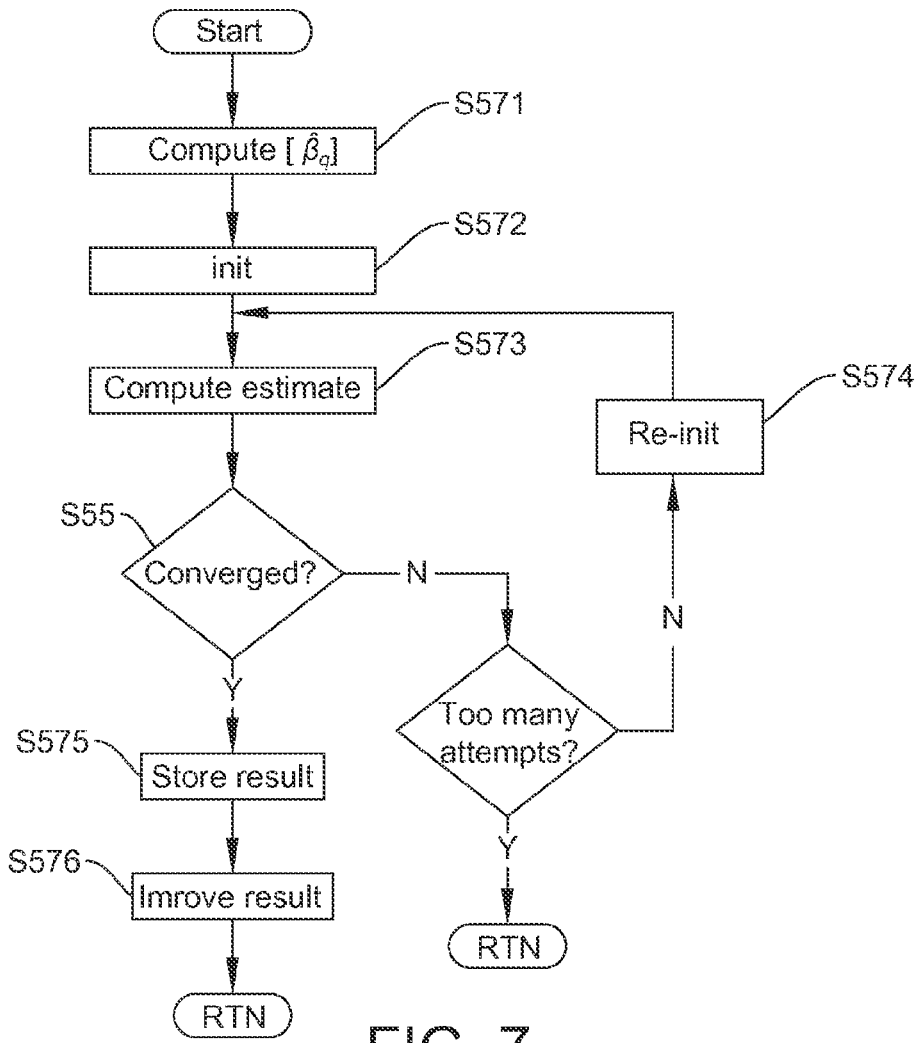
FIG. 7 illustrates a flow diagram of an example of a computer-implemented process for determining the spatial configurations of a transducer of the second subset, in particular of triaxial accelerometers, as disclosed herein.

FIG. 7 illustrates a flow diagram of an example of a computer-implemented process for determining the spatial configurations of a transducer of the second subset, in particular of triaxial accelerometers, as disclosed herein. The process may e.g. be performed by the measurement system 110 as described in connection with FIG. 1A.

In initial step S571, the process computes the transmissibility matrix $[\hat{\beta}_q]$ using expression (21).

In step S572, the process computes a starting point, e.g. as the average of the positions of the reference accelerometers.

In step S573, the process computes an initial estimate of the unknown position and orientation, e.g. using Newton's method.

If the Newton method converges, the process proceeds at step S575; otherwise, if the method does not converge, the process proceeds to step S574 where the process adds a random displacement to the starting point and returns to step S573. If the algorithm does not converge after a predetermined number of attempts (e.g. after 5-10 attempts), the process marks the current accelerator with an error and proceeds to the next accelerometer. The accelerometers marked with an error may have to be repositioned or their positions may have to be determined manually.

At step S575, the process stores the computed position and orientation for the current accelerometer.

Optionally, it has been found that the precision of the results may be further improved, when the process performs an additional minimization step S576. In particular, the additional minimization step may use the result of the Newton's method as a starting point, generate a set of constraints, e.g. using expression (29), and run a minimization algorithm minimizing a suitable objective function, e.g. as defined in expression (28). The optimization problem (28)

tries to minimize function $E(\{v_q\})^2$, which is a strongly nonlinear function of 6 variables $\{v_q\}=\{r_{q,x}, \phi_{q,2}, \phi_{q,3}\}^T$ and periodic on the latter three variables. The minimization is subject to linear constraints. The minimization may be performed by any suitable routine, e.g. using MATLAB's FMINCON. This routine automatically selects the optimization method, depending on the type of the function and the constraints. For this particular optimization problem, there is no need to provide the Jacobian and Hessian (the first and the second derivative w.r.t. variables). But in case of using another optimization algorithm that requires the sensitivities, they can be readily obtained. If the value of the objective function becomes smaller after minimization, the process may store the optimization result as a final estimate of the position and orientation. The process may further store a quality indicator of the result, e.g. the relative error of the fit.

It will be appreciated that numerous variations to the above methodology are possible. In the following, an alternative embodiment of a process for determining the spatial configurations of the transducers will be discussed. The above embodiment relied upon the knowledge of the position and orientation of the reference accelerometers: at least three accelerometers must be mounted at the positions with known coordinates and carefully aligned e.g. to the GCS. The precision in location/orientation of the reference accelerometers directly affects the resulting positions/orientation of the other accelerometers. In the embodiment of the process presented below, the requirements for determining the positions and orientations of the reference accelerometers are significantly relaxed, replacing the need of exact reference accelerometers' position and orientation by the distances between them. Hence, in this embodiment, in step S20 of the process of FIG. 2, only the relative distances between the reference accelerometers that are mounted on the target object are determined. This embodiment will also be referred to as the reference-free embodiment. It will be appreciated that, alternative to the relative distances, other spatial relationships between the transducers may be used as an input to other reference-free embodiments.

Provided the distances between the three reference accelerometers, the method outputs their positions and orientations in the LCS attached to one of them. The output of the method can be considered as the input to the previously described method, thus the position and orientation of all other accelerometers can be obtained, based on the same dataset.

To this end, consider three triaxial accelerometers mounted on an un-deformable target object which can move unrestrictedly in 3D space. Let us assume that the target object experiences small displacements in all six degrees of freedom.

Let us further mark the accelerometers by letters $\mathbb{a}$, $\mathbb{b}$ and $\mathbb{c}$. Using same convention as before, let us define the position and orientation of each accelerometer using its coordinates in LCS and three Tait-Bryan angles (using the z-y'-x" convention), which rotate the LCS to MCS of the accelerometer. For convenience, let us use vector $\{v_{\mathbb{i}}\}=\{r_{\mathbb{i}\,x}, r_{\mathbb{i}\,y}, r_{\mathbb{i}\,z}, \phi_{\mathbb{i}\,1}, \phi_{\mathbb{i}\,2}, \phi_{\mathbb{i}\,3}\}_L^T$, where $\mathbb{i}$ is either $\mathbb{a}$, $\mathbb{b}$ or $\mathbb{c}$. Let us now select the initial position of accelerometer $\mathbb{a}$ as the origin of LCS and let us select the MCS of accelerometer $\mathbb{a}$ in its initial orientation as the orientation of the LCS, thus $\{v_\mathbb{a}\}=\{0\}_L$.

The accelerometers' readings are available: $\{a(t)\}\in R^{9\times 1}$, and we can split this set of nine signals into two sets:

$$\{a(t)\} = \begin{Bmatrix} \{a_r(t)\} \\ \{a_q(t)\} \end{Bmatrix}, \tag{32}$$

where $\{a_r(t)\}\in R^{6\times 1}$ and $\{a_q(t)\}\in R^{3\times 1}$; for the purpose of the present description, we will refer to the first set as a reference set and the second set as a test set.

According to (29), the accelerations in both sets can be estimated from the $\{\ddot{C}(t)\}$ vector:

$$\{a_q(t)\}=[\beta_q]\{\ddot{C}(t)\} \text{ and } \{a_r(t)\}=[\beta_r]\{\ddot{C}(t)\}. \tag{33}$$

Isolating $\{\ddot{C}(t)\}$ from the second equation and substituting to the first one yields $$\{a_q(t)\}=[\beta_q][\beta_r]^{-1}\{a_r(t)\}. \tag{34}$$

The elements of matrices $[\beta_r]$ and $[\beta_q]$ depend on the positions and orientations of the accelerometers (13), and can be written as $[\beta_r]=[\beta_r(\{\mathcal{V}_\mathbb{b}\}, \{\mathcal{V}_\mathbb{c}\})]$ and $[\beta_q]=[\{\mathcal{V}_\mathbb{b}\}, \{\mathcal{V}_\mathbb{c}\})]$. For arbitrary $\{\mathcal{V}_\mathbb{b}\}$ and $\{\mathcal{V}_\mathbb{c}\}$, the test set signals can be estimated from the reference set signals as $$\{\hat{a}_q(t,\{\mathcal{V}_\mathbb{b}\},\{\mathcal{V}_\mathbb{c}\})\}=[\beta_q(\{\mathcal{V}_\mathbb{b}\},\{\mathcal{V}_\mathbb{c}\})]^{-1}\{a_r(t)$$
$$\}=[T_{r,q}(\{\mathcal{V}_\mathbb{b}\},\{\mathcal{V}_\mathbb{c}\})]\{a_r(t)\}. \tag{35}$$

where the matrix $$[T_{r,q}(\{\mathcal{V}_\mathbb{b}\},\{\mathcal{V}_\mathbb{c}\})]=[\beta_q(\{\mathcal{V}_\mathbb{b}\},\{\mathcal{V}_\mathbb{c}\})][\beta_r(\{\mathcal{V}_\mathbb{b}\},\{\mathcal{V}_\mathbb{c}\})]^{-1} \tag{36}$$

can be interpreted as a transmissibility matrix between the signals from the reference set and the signals from the test set.

The difference between the predicted j-th signal from the test set and the corresponding measured signal is $$\varepsilon_j(t,\{\mathcal{V}_\mathbb{b}\},\{\mathcal{V}_\mathbb{c}\})=\{\hat{a}_q(t,\{\mathcal{V}_\mathbb{b}\},\{\mathcal{V}_\mathbb{c}\})\}_j-\{a_q(t)\}_j. \tag{37}$$

In the sampled form, $\varepsilon_j(t, \{\mathcal{V}_\mathbb{b}\}, \{\mathcal{V}_\mathbb{c}\})\to\{\varepsilon_j(t_i, \{\mathcal{V}_\mathbb{b}\}, \{\mathcal{V}_\mathbb{c}\})\}$, where time samples $t_i=(i-1)\Delta t, i=1\ldots M$. Then the difference can be characterized by its mean squared:

$$E_j(\{\mathcal{V}_\mathbb{b}\},\{\mathcal{V}_\mathbb{c}\})^2 = \frac{1}{M}\{\varepsilon_j(t_i,\{\mathcal{V}_\mathbb{b}\},\{\mathcal{V}_\mathbb{c}\})\}^T\{\varepsilon_j(t_i,\{\mathcal{V}_\mathbb{b}\},\{\mathcal{V}_\mathbb{c}\})\}. \tag{38}$$

and for all three test channels, $$E(\{\mathcal{V}_\mathbb{b}\},\{\mathcal{V}_\mathbb{c}\})^2=\Sigma_{j=1}^3 E_j(\{\mathcal{V}_\mathbb{b}\},\{\mathcal{V}_\mathbb{c}\})^2. \tag{39}$$

Now one can formulate a minimization problem as $$\min_{\{v_\mathbb{b}\},\{v_\mathbb{c}\}} (E(\{\mathcal{V}_\mathbb{b}\},\{\mathcal{V}_\mathbb{c}\})^2) \tag{40}$$

subject to $$\{\mathcal{V}_\mathbb{b}\}_{min} \leq \{\mathcal{V}_\mathbb{b}\} \leq \{\mathcal{V}_\mathbb{b}\}_{max}$$
$$\{\mathcal{V}_\mathbb{c}\}_{min} \leq \{\mathcal{V}_\mathbb{c}\} \leq \{\mathcal{V}_\mathbb{c}\}_{max}$$

The constraints in (40) are geometrical constraints—not allowing the accelerometers positions to be sought outside the target object dimensions and the constraints on Euler angles, (29).

The inventors believe that the product $[\beta_q(\{\mathcal{V}_\mathbb{b}\}, \{\mathcal{V}_\mathbb{c}\})][\beta_r(\{\mathcal{V}_\mathbb{b}\}, \{\mathcal{V}_\mathbb{c}\})]$ is invariant to the linear scale, i.e. if all linear dimensions in $\{\mathcal{V}_\mathbb{b}\}$ and $\{\mathcal{V}_\mathbb{c}\}$ are multiplied by a same scalar, the resulting matrix product is the same. Intuitively, it could be understood as using different linear units when measuring the linear distances, e.g. inches or millimeters. This means that the solution will contain distances up to a multiplier; in case of using minimization, the minimization routine will have difficulties in convergence. One way to avoid this is to introduce extra constraints, for example providing the optimization routine with the distances between the three accelerometers, $d_{a,b}$, $d_{a,c}$ and $d_{b,c}$. These the constraints will be:

$$|\hat{d}_{a,b}(\{v_b\},\{v_c\}) - d_{a,b}| \le \varepsilon_l,$$

$$|\hat{d}_{a,c}(\{v_b\},\{v_c\}) - d_{a,c}| \le \varepsilon_l,$$

$$|\hat{d}_{b,c}(\{v_b\},\{v_c\}) - d_{b,c}| \le \varepsilon_l \quad (41)$$

where $\hat{d}_{i,j}(\{v_b\},\{v_c\})$ is the estimated distance between the accelerometers $i$ and $j$, computed for $\{v_b\}$ and $\{v_c\}$ and $\varepsilon_l$ is an allowed linear tolerance.

Note that the reference set consists of a combination of six signals from all the three accelerometers. A convenient (but not obligatory) way is to compose it from all three signals of the accelerometer $a$, one or two signals from $b$ and the rest from $c$, for example, a possible reference set could be R={$a_x$, $a_y$, $a_z$, $c_x$, $c_y$, $b_x$}, where the subscript indicates the measurement direction of the given accelerometer. Then the test set should include the remaining signals, namely Q={$b_z$, $c_y$, $c_z$}. The strategy for selecting the optimal signals will be discussed later.

It is convenient to construct the [$\beta_r$] and [$\beta_q$] matrices as follows: first construct the full 9×6 matrix $$[\beta_{a,b,c}] = \begin{bmatrix} [\beta_a] \\ [\beta_b] \\ [\beta_c] \end{bmatrix} = \begin{bmatrix} [\beta(\{v_a\})] \\ [\beta(\{v_b\})] \\ [\beta(\{v_c\})] \end{bmatrix} = \begin{bmatrix} [\beta(\{0\})] \\ [\beta(\{v_b\})] \\ [\beta(\{v_c\})] \end{bmatrix} \quad (42)$$

and then extract the rows corresponding to the reference and test sets:

$$[\beta_r] = [\beta_{a,b,c}]_R,$$

$$[\beta_q] = [\beta_{a,b,c}]_Q. \quad (43)$$

The same holds for the time histories. If $\{a_{a,b,c}(t)\}$ is a collection of all time histories from the three accelerometers, then $$\{a_r(t)\} = \{a_{a,b,c}(t)\}_R,$$

$$\{a_q(t)\} = \{a_{a,b,c}(t)\}_Q. \quad (44)$$

As the expression (35) involves the inverse of [$\beta_r$], it may be preferable that the six time histories in $\{a_r(t)\}$ are as independent as possible. If written in sampled form, $\{a_r(t)\} \rightarrow [a_r(t_i)]$, i=1 ... M, it may be preferable to select the content of the set R in such a way that the condition value of matrix $[a_r(t_i)]$ is the smallest. As the number of possible combinations of the signals in R is 6!/(3! (6−3)!)=20, and the SVD operation is very fast, it is possible to iterate all possible combinations and pick the one giving the smallest condition number.

Summarizing, solving the minimization problem (40) with the constraints set extended by (41), will provide the position and orientation of the accelerometers $b$ and $c$, $\{v_b,\}=\{r_{b\,x}, r_{b\,y}, r_{b\,z}, \phi_{b\,1}, \phi_{b\,2}, \phi_{b\,3}\}_L^T$ and $\{v_c,\}=\{r_{c\,x}, r_{c\,y}, r_{c\,z}, \phi_{c\,1}, \phi_{c\,2}, \phi_{c\,3}\}_L^T$ in the LCS defined by the MCS of the accelerometer $a$.

The objective function $E(\{v_b\},\{v_c\})^2$ in (40) is a strongly nonlinear function of its 12 parameters, with the optimization problem subjected to nonlinear constraints (41). In some situations, the convergence of the optimization problem may be sensitive to the selection of a good starting point.

To solve this problem, it may be beneficial to seek for a relaxed formulation of the optimization problem. It is important to note that such a relaxed formulation should still be practical.

Below, we suggest one of the possible relaxed formulation where the number of the variables is reduced from 12 to 8. This may be achieved by defining the LCS in such a way that its X0Y plane is horizontal. As the LCS is defined by the MCS of the accelerometer $a$, in practice it means that its Z-axis should be vertical. The same should be required from the accelerometers $b$ and $c$. If this requirement is satisfied, the rotations from the LCS to the MCSs of the two latter accelerometers consist of only one rotation, namely the rotation about LCS's Z-axis by angles $\phi_{b\,1}$ and $\phi_{c\,1}$ and setting other four angles to 0: $\phi_{b\,2} = \phi_{c\,3} = \phi_{c\,2} = \phi_{c\,3} = 0$.

The practical implementation of this requirement is not particularly difficult to fulfill: Using a spirit level, it is relatively easy to align the three accelerometers such that their X0Y planes (or another plane of the MCS) are horizontal. Note, there is no special requirement regarding the orientation of the accelerometers in the X0Y plane (i.e. their heading, $\phi_{b\,1}$ and $\phi_{c\,1}$ angles) but in practice it is advantageous to know the approximate heading of the accelerometers, to use these values as the starting point of the minimization routine.

In practice, the non-relaxed optimization can follow the relaxed one, as described below:
1. The three reference accelerometers are mounted according to the relaxed formulation
2. The relaxed optimization is performed, using the approximate position of the reference accelerometers and their heading $\phi_{b\,1}$ and $\phi_{c\,1}$ as a starting point.
3. After the convergence of the relaxed formulation, the resulting values can be used as a starting point for the non-relaxed optimization to obtain the refined position and orientation.
4. Finally, the coordinates and orientation of the reference accelerometers are used to obtain the coordinates and orientation of all other accelerometers, based on the same dataset.

In this way the accuracy of the results may be increased, e.g. in situations where the accelerometers are not perfectly aligned with the direction of gravity.

The optimization problem (40) seeks a minimum of a real scalar positive objective function $E(\{v_b\},\{v_c\})^2$, which is a strongly nonlinear function of 12 variables (8 variables for the relaxed case), and periodic on some of them. The minimization is subjected to a set of nonlinear constraints (41).

MATLAB's FMINCON, which is a part of MATLAB's Optimization Toolbox, is a convenient routine to solve the minimization problem. In this particular formulation, FMINCON requires providing the sensitivity of the objective function and the constraints w.r.t. the variables. It requires both first order derivative (Jacobian) and the second order sensitivities (Hessian) of the objective function and the constraints.

FMINCON can compute the derivatives automatically, using finite difference. However, it may be preferable to provide analytic (exact) sensitivities whenever possible. The derivation of sensitivities is explained in the following.

The objective function (39) is a function of either 8 or 12 variables, depending on if the relaxed or not-relaxed formulation is considered. If all variables are combined into a single vector $\{\mathcal{V}_{b,c}\}=\{\{\mathcal{V}_b\}; \{\mathcal{V}_c\}\}^T$, the Jacobian of the objective function is a vector $\{J(\{\mathcal{V}_{b,c}\})\}$ whose i-th element is $$\{J(\{\mathcal{V}_{b,c}\})\}_i = \frac{\partial}{\partial\{\mathcal{V}_{b,c}\}_i} E(\{\mathcal{V}_{b,c}\})^2 \tag{45}$$

From the definition of the objective function (39), $$\frac{\partial}{\partial\{\mathcal{V}_{b,c}\}_i} E(\{\mathcal{V}_{b,c}\})^2 = \sum_{j=1}^{3} \frac{\partial}{\partial\{\mathcal{V}_{b,c}\}_i} E_j(\{\mathcal{V}_{b,c}\})^2. \tag{46}$$

Utilizing (35)-(38), $$E_j(\{\mathcal{V}_{b,c}\})^2 = \frac{1}{M}\{\varepsilon_j(t_i, \{\mathcal{V}_{b,c}\})\}\{\varepsilon_j(t_i, \{\mathcal{V}_{b,c}\})\}^T, \tag{47}$$

where the difference between the predicted and measured signal $\{\varepsilon_j(t_i, \{\mathcal{V}_{b,c}\})\} \in \mathbb{R}^{1 \times M}$ is $$\{\varepsilon_j(t_i, \{\mathcal{V}_{b,c}\})\} = [T_{r,q}(\{\mathcal{V}_{b,c}\})]_j [a_r(t_i)] - \{a_q(t_i)\}_j, \tag{48}$$

using the sampled representation of signals: $\{a_r(t)\} \to [a_r(t_i)]$, and $[a_r(t_i)] \in \mathbb{R}^{6 \times M}$. Note, the subscript j after $\{\ \}$ or $[\ ]$ brackets denotes the j-th element of the vector or the j-th row of the matrix, respectively. Here the difference between the predicted and measured signal $\{\varepsilon_j(t_i, \{\mathcal{V}_{b,c}\})\} \in \mathbb{R}^{1 \times M}$.

Differentiating, $$\frac{\partial}{\partial\{\mathcal{V}_{b,c}\}_i} E_j(\{\mathcal{V}_{b,c}\})^2 = \tag{49}$$

$$\frac{1}{M}\left(\frac{\partial}{\partial\{\mathcal{V}_{b,c}\}_i}\{\varepsilon_j(t_i, \{\mathcal{V}_{b,c}\})\} \times \{\varepsilon_j(t_i, \{\mathcal{V}_{b,c}\})\}^T + \{\varepsilon_j(t_i, \{\mathcal{V}_{b,c}\})\} \times \frac{\partial}{\partial\{\mathcal{V}_{b,c}\}_i}\{\varepsilon_j(t_i, \{\mathcal{V}_{b,c}\})\}^T\right)$$

substituting (48), $$\frac{\partial}{\partial\{\mathcal{V}_{b,c}\}_i}\{\varepsilon_j(t_i, \{\mathcal{V}_{b,c}\})\} = \tag{50}$$

$$\frac{\partial}{\partial\{\mathcal{V}_{b,c}\}_i}\left([T_{r,q}(\{\mathcal{V}_{b,c}\})]_j [a_r(t_i)] - \{a_q(t_i)\}_j\right) = $$

$$\frac{\partial}{\partial\{\mathcal{V}_{b,c}\}_i}\left([T_{r,q}(\{\mathcal{V}_{b,c}\})]_j\right)[a_r(t_i)]$$

and making use of (36), we obtain $$\frac{\partial}{\partial\{\mathcal{V}_{b,c}\}_i}\left([T_{r,q}(\{\mathcal{V}_{b,c}\})]_j\right) = \tag{51}$$

$$\frac{\partial}{\partial\{\mathcal{V}_{b,c}\}_i}([\beta_q(\{\mathcal{V}_{b,c}\})][\beta_r(\{\mathcal{V}_{b,c}\})]^{-1}) = \frac{\partial}{\partial\{\mathcal{V}_{b,c}\}_i}([\beta_q(\{\mathcal{V}_{b,c}\})]) \times [\beta_r(\{\mathcal{V}_{b,c}\})]^{-1} + [\beta_q(\{\mathcal{V}_{b,c}\})] \times \frac{\partial}{\partial\{\mathcal{V}_{b,c}\}_i}([\beta_r(\{\mathcal{V}_{b,c}\})]^{-1})$$

Whilst the derivative of the $[\beta_q(\{\mathcal{V}_{b,c}\})]$ matrix is rather straightforward, the derivative of the inverse is more involving:

$$\frac{\partial}{\partial\{\mathcal{V}_{b,c}\}_i}([\beta_r(\{\mathcal{V}_{b,c}\})]^{-1}) = \tag{52}$$

$$-[\beta_r(\{\mathcal{V}_{b,c}\})]^{-1} \times \frac{\partial}{\partial\{\mathcal{V}_{b,c}\}_i}([\beta_r(\{\mathcal{V}_{b,c}\})]) \times [\beta_r(\{\mathcal{V}_{b,c}\})]^{-1}$$

Combining all the above-mentioned and substituting into (45), one can get analytical expression for the Jacobian (except the matrix inverse, which is more convenient to compute using numerical methods).

The Hessian is a square matrix whose elements are $$[H(\{\mathcal{V}_{b,c}\})]_{i,j} = \frac{\partial^2}{\partial\{\mathcal{V}_{b,c}\}_i \partial\{\mathcal{V}_{b,c}\}_j}(E(\{\mathcal{V}_{b,c}\})^2) \tag{53}$$

The elements of Hessian can be computed using the same considerations as for Jacobian.

Sensitivities of the Constraints:

Following standard constraints representation for optimization problems, the constraints (41) can be reformulated as $$c_{a,b} = (\hat{d}_{a,b}(\{\mathcal{V}_{b,c}\})^2 - d_{a,b}^2)^2 - \varepsilon_l^4 \leq 0,$$

$$c_{a,c} = (\hat{d}_{a,c}(\{\mathcal{V}_{b,c}\})^2 - d_{a,c}^2)^2 - \varepsilon_l^4 \leq 0,$$

$$c_{b,c} = (\hat{d}_{b,c}(\{\mathcal{V}_{b,c}\})^2 - d_{b,c}^2)^2 - \varepsilon_l^4 \leq 0. \tag{54}$$

where the estimates of the squared distances for the given variables values $\{\mathcal{V}_{b,c}\}$ are $$\hat{d}_{a,c}(\{\hat{d}_{a,b}\})^2 = r_{b,x}^2 + r_{b,y}^2 + r_{b,z}^2,$$

$$\mathcal{V}_{b,c}(\{\mathcal{V}_{b,c}\})^2 = r_{c,x}^2 + r_{c,y}^2 + r_{c,z}^2,$$

$$\hat{d}_{b,c}(\{\mathcal{V}_{b,c}\})^2 = (r_{b,x} - r_{c,x})^2 + (r_{b,y} + r_{c,y}) + (r_{b,z} - r_{c,z})^2, \tag{55}$$

and the gradients of the constraints (54) are quite straightforward. The constraints gradients is a 3×8 or 3×12 matrix; as an example, few elements are provided below.

$$\frac{\partial c_{a,b}}{\partial r_{b,x}} = 4(\hat{d}_{a,b}(\{\mathcal{V}_{b,c}\})^2 - d_{a,b}^2) r_{b,x} \tag{56}$$

$$\frac{\partial c_{b,c}}{\partial r_{b,x}} = 4(\hat{d}_{b,c}(\{\mathcal{V}_{b,c}\})^2 - d_{b,c}^2)(r_{b,x} - r_{c,x})$$

The derivatives w.r.t. Euler angles are zeros.

The embodiments of the method described above assume that the target object is rigid and its motion is unconstrained. In the following an embodiment will be described which can be applied to flexible target objects whose motion can be constrained. In many applications, such objects represent a significant fraction of target objects, where the presented methodology can be helpful. Examples include a wind turbine blade mounted on a test rig, civil structures like bridges, towers, chimneys, and alike.

Figure 8:
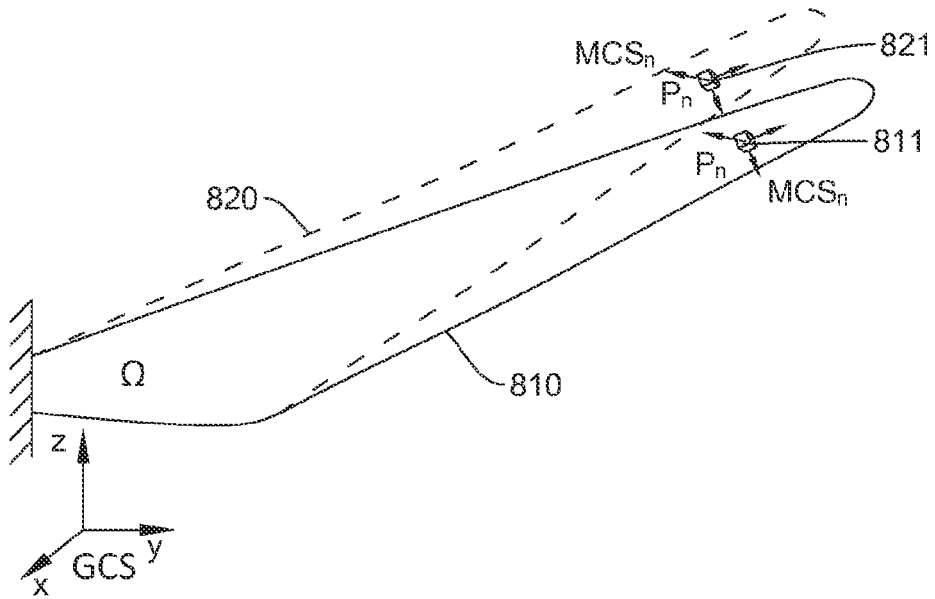
FIG. 8 illustrates an example of a deformable target object whose motion is constrained.

FIG. 8 illustrates an example of a deformable target object whose motion is constrained, the latter being described by some boundary conditions. In the non-deformed state of the target object 810, each point P of the target object has coordinates described by the radius vector, which in GCS is $\{r\}_G \in \Omega$, where $\Omega$ is the domain where the target object is defined. At any time t, the displacement of the point P is defined by the vector $\{d(\{r\}_G, t)\}_G$. Then its acceleration is $$\{a(\{r\},t)\} = \{\ddot{d}(\{r\},t)\}. \tag{57}$$

Here and further in the text the subscripts denoting GCS are omitted.

Consider the target object in the non-deformed state 810. A triaxial accelerometer 811 is mounted on the object at point $P_n$ with coordinates in GCS $\{r_n\} \in \Omega$, and its orientation is such that its MCS can be obtained from the GCS by the rotation matrix $[R_{GM,n}]$.

When the target object vibrates, the three (scalar) signals sensed by the accelerometer are $$a_{n,i}(t) = \{i_n(t)\}^T \{a(\{r_n\},t)\},$$

$$a_{n,j}(t) = \{j_n(t)\}^T \{a(\{r_n\},t)\},$$

$$a_{n,k}(t) = \{k_n(t)\}^T \{a(\{r_n\},t)\}, \tag{58}$$

where $\{i_n(t)\}$, $\{j_n(t)\}$ and $\{k_n(t)\}$ are the orts of the MCS presented in the GCS. The orts coordinates in GCS can be obtained as:

$$\{i_n(t)\} = [R_{MG,n}(t)]\{1,0,0\}^T,$$

$$\{j_n(t)\} = [R_{MG,n}(t)]\{1,0,0\}^T,$$

$$\{k_n(t)\} = [R_{MG,n}(t)]\{0,0,1\}^T, \tag{59}$$

where $$[R_{MG,n}(t)] = [R_{GM,n}(t)]^{-1} = [R_{GM,n}(t)]^T \tag{60}$$

is a rotation matrix from MCS to GCS. Making use of (59), (60) and combining the scalars in (58) into the vector $\{a_n(t)\} = \{a_{n,i}(t), a_{n,j}(t), a_{n,k}(t)\}^T$ one obtains $$\{a_n(t)\} = [R_{GM,n}(t)]\{a(\{r_n\},t)\}. \tag{61}$$

Using Galerkin method, one can expand $$\{d(\{r\},t)\} = \sum_k^\infty D_k(t)\{\Psi_k(\{r\})\}, \tag{62}$$

where $\{\Psi_k(\{r\})\}$, $k=1 \ldots \infty$ is a set of time-independent vectors that satisfy boundary conditions (so-called, essential boundary conditions) and are mutually-orthogonal. $D_k(t)$ are time-dependent scalars. One of the convenient (but not necessary) choices of $\{\Psi_k(\{r\})\}$ are the mode shapes of the object, then $D_k(t)$ are so-called modal coordinates.

At any given limited frequency range, (62) can be presented as $$\{d(\{r\},t)\} = \sum_k^{k \in \mathbb{K}} D_k(t)\{\Psi_k(\{r\})\} + \sum_k^{k \in \mathbb{K}} D_k(t)\{\Psi_k(\{r\})\}, \tag{63}$$

where the first sum significantly contributes to the overall displacement of the target object and the latter does not, and can be neglected. Differentiating twice w.r.t. time, $$\{a(\{r\},t)\} \approx \sum_k^{k \in \mathbb{K}} A_k(t)\{\Psi_k(\{r\})\}, \tag{64}$$

where $A_k(t) = \ddot{D}_k$.

Substituting (64) into (61) yields $$\{a_n(t)\} \approx \sum_k^{k \in \mathbb{K}} A_k(t)[R_{GM,n}(t)]\{\Psi_k(\{r_n\})\}. \tag{65}$$

The time dependent rotation matrix $[R_{GM,n}(t)]$ can be presented as a combination of the rotation matrix in non-deformed state $[R_{GM,n}]$ and the rotation matrix $[R_{MM',n}(t)]$, where subscript M' denotes the MCS in the deformed state of the object:

$$[R_{GM,n}(t)] = [R_{GM,n}][R_{MM',n}(t)]. \tag{66}$$

The latter depends on the three Euler angles $\theta_1(t)$, $\theta_2(t)$ and $\theta_3(t)$ that define the sequence of rotations from the MCS in non-deformed state to MCS in deformed state.

Let us assume the vibration magnitude is small and utilize $\in$ as a bookkeeper to mark small terms in the equations, $$A_k(t) = \in A_k(t), \tag{67}$$

and $\theta_1(t) = \in \theta_1(t)$, $\theta_2(t) = \in \theta_2(t)$ and $\theta_3(t) = \in \theta_3(t)$. The construction of the rotation matrix is similar to (8); for small Euler angles $\cos(\in \theta(t)) = 1 + O(\in^2)$ and $\sin(\in \theta(t)) = O(\in)$, the matrix becomes $$[R_{MM',n}(t)] = [E] + [O(\in)]. \tag{68}$$

Substituting (68) into (66), and then, together with (67), into (65), yields $$\{a_n(t)\} \approx \sum_k^{k \in \mathbb{K}} (\in A_k(t)[R_{GM,n}]\{\Psi_k(\{r_n\})\} + O(\epsilon^2)). \tag{69}$$

Omitting the terms of order $\in^2$ and higher and removing the bookkeeper, we obtain $$\{a_n(t)\} \approx \sum_k^{k \in \mathbb{K}} A_k(t)[R_{GM,n}]\{\Psi_k(\{r_n\})\} = [R_{GM,n}]\sum_k^{k \in \mathbb{K}} A_k(t)\{\Psi_k(\{r_n\})\}. \tag{70}$$

The latter sum can be re-written as a product $$\sum_{k=1}^K A_k(t)\{\Psi_k(\{r_n\})\} = [\{\Psi_1(\{r_n\})\}\{\Psi_2(\{r_n\})\}\ldots \{\Psi_K(\{r_n\})\}]\begin{Bmatrix} A_1(t) \\ A_2(t) \\ \ldots \\ A_K(t) \end{Bmatrix}$$

$$= [\Psi_\mathbb{K}(\{r_n\})]\begin{Bmatrix} A_1(t) \\ A_2(t) \\ \ldots \\ A_K(t) \end{Bmatrix}, \tag{71}$$

where k is an index in the set $\mathbb{K}$, and K is its size. Thus, $$\{a_n(t)\} \approx [R_{GM,n}][\Psi_\mathbb{K}(\{r_n\})]\begin{Bmatrix} A_1(t) \\ A_2(t) \\ \ldots \\ A_K(t) \end{Bmatrix}. \tag{72}$$

Let us now assume that the positions and orientations of $\mathbb{R}$ accelerometers from a set are known, which we call a reference set. Thus the $[\Psi_\mathbb{K}(\{r_n\})]$ and $[R_{GM,n}]$ for $n\in\mathbb{R}$ are known. Stacking together the expressions for all accelerometers from the reference set, $$\begin{Bmatrix} \{a_1(t)\} \\ \{a_2(t)\} \\ \cdots \\ \{a_R(t)\} \end{Bmatrix} \approx \begin{bmatrix} [R_{GM,1}][\Psi_\mathbb{K}(\{r_1\})] \\ [R_{GM,2}][\Psi_\mathbb{K}(\{r_2\})] \\ \cdots \\ [R_{GM,R}][\Psi_\mathbb{K}(\{r_R\})] \end{bmatrix} \begin{Bmatrix} \{A_1(t)\} \\ \{A_2(t)\} \\ \cdots \\ \{A_K(t)\} \end{Bmatrix}. \tag{73}$$

Let us also assume that the readings (time histories) of these accelerometers are available at any time t. Therefore, the time-dependent coefficients in the right-hand side of (73) can be estimated as $$\begin{Bmatrix} \tilde{A}_1(t) \\ \tilde{A}_2(t) \\ \cdots \\ \tilde{A}_K(t) \end{Bmatrix} = \begin{bmatrix} [R_{GM,1}][\Psi_\mathbb{K}(\{r_1\})] \\ [R_{GM,2}][\Psi_\mathbb{K}(\{r_2\})] \\ \cdots \\ [R_{GM,R}][\Psi_\mathbb{K}(\{r_R\})] \end{bmatrix}^\dagger \begin{Bmatrix} \{a_1(t)\} \\ \{a_2(t)\} \\ \cdots \\ \{a_R(t)\} \end{Bmatrix}. \tag{74}$$

The necessary condition for solvability of (74) is the matrix in (73) is square or vertical, i.e. its number of rows is greater or equal the number of columns, or $K \le 3R$.

The described procedure for obtaining coefficients $A_k(t)$ resembles the procedure of calculating modal coordinates, which are given in details in e.g. (D. J. Ewins, "Modal testing: Theory, practice and applications", Research Studies Press Ltd., 2000). In this case, the vectors $\{\Psi_i(\{r\})\}$ are the mode shapes of the target objects.

From the computed coefficients $A_k(t)$, the positions and orientations of the accelerometers which are not in the reference set (i.e. the accelerometers of the second subset) can now be determined as follows:

Expression (72), which is re-written below for convenience, states that at some frequency range, the readings of the n-th accelerometer, located at point $\{r_n\}$ and oriented such way that its rotation matrix is $[R_{GM,n}]$, can be estimated as $$\{a_n(t)\} \approx [R_{GM,n}][\Psi_\mathbb{K}(\{r_n\})]\begin{Bmatrix} A_1(t) \\ A_2(t) \\ \cdots \\ A_K(t) \end{Bmatrix}. \tag{75}$$

Here we consider that the accelerometer reading $\{a_n(t)\}$ (the three time-histories) are available, vectors $\{\Psi_k(\{r\})\}$ are known (or can be approximated) at any point $\{r\}\in\Omega$, and the time-dependent weightings $A_k(t)$ can be found as described in the previous section.

For signals sampled at $t_i$, $i=1$ M, the accelerometer readings $\{a_n(t)\}$ and $\{A_1(t), \ldots, A_K(t)\}^T$ can be presented as matrices:

$$\{a_n(t)\} \to \begin{bmatrix} a_{n,x}(t_1) & \cdots & a_{n,x}(t_M) \\ a_{n,y}(t_1) & \cdots & a_{n,y}(t_M) \\ a_{n,z}(t_1) & \cdots & a_{n,z}(t_M) \end{bmatrix} = [a_n(t_i)] \in R^{3 \times M}, \tag{76}$$

$$\begin{Bmatrix} A_1(t) \\ A_2(t) \\ \cdots \\ A_K(t) \end{Bmatrix} \to \begin{bmatrix} A_1(t_1) & \cdots & A_1(t_M) \\ \vdots & \vdots & \vdots \\ A_K(t_1) & \cdots & A_K(t_M) \end{bmatrix} = [A(t_i)] \in R^{K \times M},$$

thus (75) becomes $$[a_n(t_i)] \approx [R_{GM,n}] \Psi_\mathbb{K}(\{r_n\})[A(t_i)]. \tag{77}$$

Expression (77) resembles (20), which was formulated for the unconstrained rigid body case, and shows the similarity between the two cases.

There are six unknowns: the accelerometer coordinates $\{r_i\}$ and its orientation, described by the three Euler angles $\phi_{n,1}$, $\phi_{n,2}$, $\phi_{n,3}$, as the rotation matrix is a function of the Euler angles, $[R_{GM,n}]=[R_{GM}(\phi_{n,1}, \phi_{n,2}, \phi_{n,3})]$. It is convenient to combine all six unknowns into a single vector $$\{v_n\} = \{r_{n,x}, r_{n,y}, r_{n,z}, \phi_{n,1}, \phi_{n,2}, \phi_{n,3}\}^T.$$

At a trial position/orientation characterized by vector $\{v_q\}$, the estimated accelerations are $$[\tilde{a}_q(t_i, \{v_q\})] = [R_{GM}(\phi_{q,1}, \phi_{q,2}, \phi_{q,3})][\Psi_\mathbb{K}(\{r_{q,x}, r_{q,y}, r_{q,z}\}^T)][A(t_i)], \tag{78}$$

and at each time sample, the error between the measured and estimated accelerations is $$\begin{bmatrix} \{\varepsilon_x(t_i, \{v_q\})\}^T \\ \{\varepsilon_y(t_i, \{v_q\})\}^T \\ \{\varepsilon_z(t_i, \{v_q\})\}^T \end{bmatrix} = [\tilde{a}_q(t_i, \{v_q\})] - [a_n(t_i)]. \tag{79}$$

The error for each measurement axis can be characterized by the mean squared:

$$E_x(\{v_q\})^2 = \frac{1}{M}\{\varepsilon_x(t_i, \{v_q\})\}^T\{\varepsilon_x(t_i, \{v_q\})\},$$

$$E_y(\{v_q\})^2 = \frac{1}{M}\{\varepsilon_y(t_i, \{v_q\})\}^T\{\varepsilon_y(t_i, \{v_q\})\}, \tag{80}$$

$$E_z(\{v_q\})^2 = \frac{1}{M}\{\varepsilon_z(t_i, \{v_q\})\}^T\{\varepsilon_z(t_i, \{v_q\})\},$$

where the left-hand-sides of the expressions (80) are positive scalar functions of the vector of variables $\{v_q\}$, which can be combined into a positive scalar function $$E(\{v_q\})^2 = E_x(\{v_q\})^2 + E_y(\{v_q\})^2 + E_z(\{v_q\})^2. \tag{81}$$

Then the minimization problem can be formulated as:

$$\min_{\{v\}} (E(\{v_q\})^2) \tag{82}$$

subject to $$\{v\}_{min} \le \{v_q\} \le \{v\}_{max}$$

The latter presents the possible constraints, for example the position of the accelerometer shall not be outside the target object ($\{r_{n,x}, r_{n,y}, r_{n,z}\}^T \in \Omega$), and the Euler angles are typically subjected to $0 \leq \phi_{q,1} \leq 2\pi,$ $0 \leq \phi_{q,2} \leq \pi,$ $0 \leq \phi_{q,3} \leq 2\pi,$ (83)

The embodiment presented above demonstrates how the methodology for finding positions/orientations of accelerometers can be applied to deformable target objects, whose motion is constrained by some (sufficiently rigid) supports. Examples of such target objects are include many objects tested "in situ", which are typically big civil structures, e.g. wind turbines, towers, bridges, etc.

The method assumes that one can find a set of spatial functions $\{\Psi_k(\{r\})\}$, $r \in \Omega$ which (i) satisfy essential boundary conditions of the target object and (ii) mutually orthogonal. The best set of such functions is a set mode shapes, known e.g. from FE analysis of the target object. Any other set satisfying the abovementioned conditions is valid, however they may require more shapes to be taken into account, and consequently, need more reference accelerometers.

The method comprises:
Computing time dependent coefficients $A_k(t)$, k=1 ... K. This procedure is similar to e.g. obtaining modal coordinates in modal decomposition.
Calculating the position and orientation of the accelerometers by minimizing the fit error.

Figure 9:
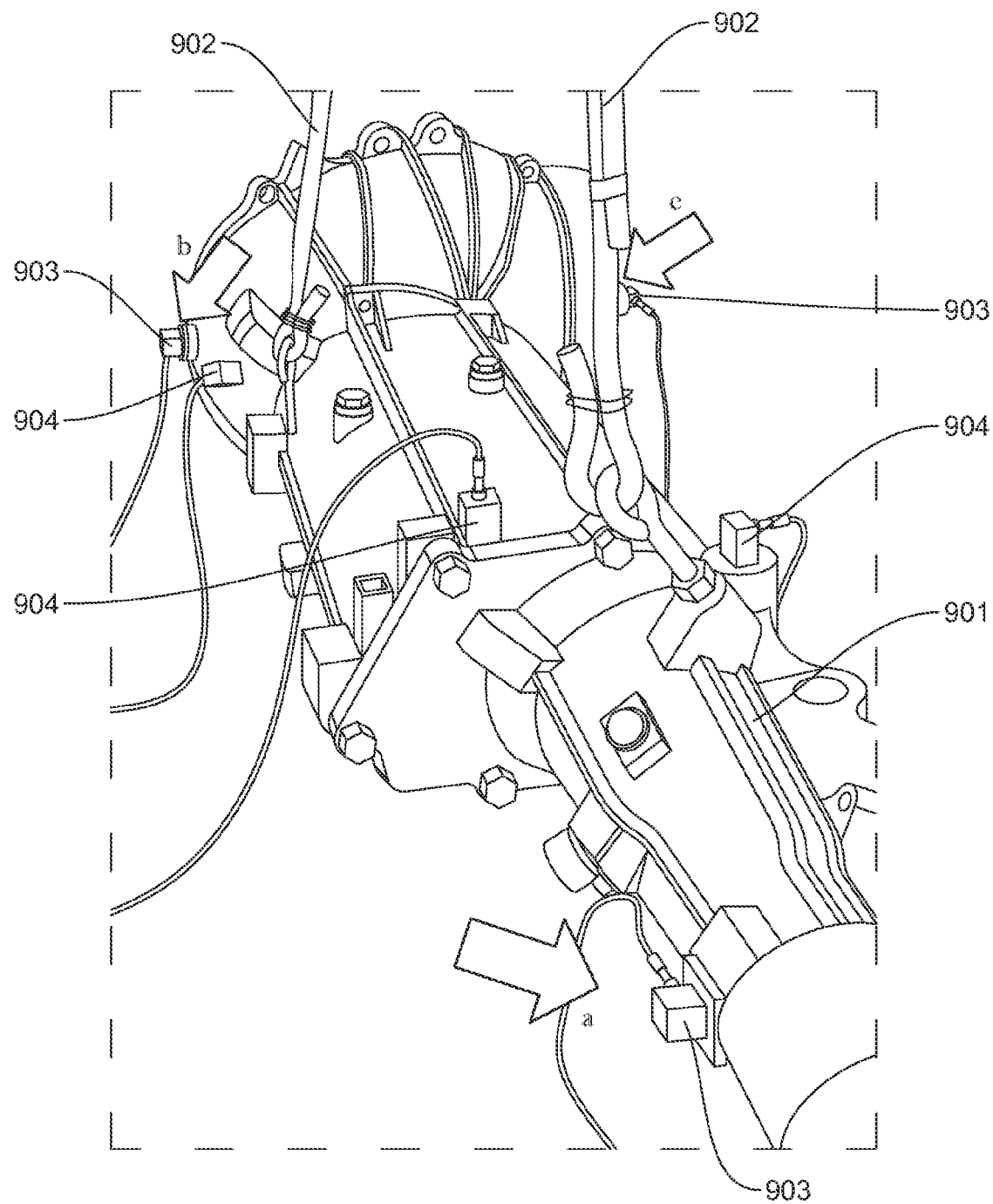
FIG. 9 shows a view of an example of a target object having transducers mounted thereon.

Example:

FIG. 9 shows different views of an example of a target object having transducers mounted thereon. A transmission housing 901 was supported by rubber bands 902 as shown in FIG. 9. Three accelerometers 903 type 4506 B available from Brüel & Kjær Sound & Vibration Measurement A/S, Nerum, Denmark were selected as reference accelerometers and mounted as shown in FIG. 9. Using spirit level UA-140 and swivel bases UA-1473, both available from Brüel & Kjær Sound & Vibration Measurement A/S, Nerum, Denmark, the accelerometers were aligned so their Y axes were vertical and pointing upwards. The coordinates of the reference accelerometers were measured using BIG FP5500 3D Creator, available from Boulder Innovation Group, Inc., Boulder, Colo., USA, with a sub-millimeter precision:

Reference ⓐ (red): 227.7; 248.5; 665.8 mm
Reference ⓑ (blue): 179.2; 380.6; 22.9 mm
Reference ⓒ (green): 376.9; 86.4; 59.8 mm The coordinates are given in GCS, measured when the transmission was standing vertically, with GCS's Z axis pointing upward. The eight corners of each sensor were digitized, and the provided coordinates correspond to the geometrical center of the eight corners. The main features of the structure (most distinct edges and ribs) were digitized point by point by BIG FP5500 3D Creator using an ATC software that provided highly precise wireframe model. To improve visualization, the transmission housing was also digitized using the Sony 3D Creator app running on a Sony Xperia XZ1 mobile phone, which was exported to MATLAB via a Wavefront OBJ file. The latter representation consists of nodes and triangular faces.

More specifically, the following process was employed:
1. Reference accelerometers were mounted and aligned as described above.
2. The structure was digitized using BIG FP5500
    a. The coordinates of the centers of the reference accelerometers (based on their corners) were obtained
    b. 31 points were selected on the structure, noted by crosses, numbered, and the coordinates of the crosses, obtained by BIG FP5500, were denoted.
    c. 12 of the 31 points were chosen for checking orientation precision: namely, placed next to the features of the structure (like corners) to allow visual aligning of the accelerometers to the structure.
3. Measurements for six setups were done (named Setup [1,2,4,5,6,7])
    a. Each setup includes three reference accelerometers and
    b. Five more accelerometers 904, which were attached to the transmission housing at known locations.
    c. Setups ##4,5,6 were specially designed for measuring orientation precision
4. For each setup,
    a. Positions and orientations of all 8 accelerometers were computed using the "reference-free" embodiment described herein.
    b. The obtained positions of the accelerometers were compared to their known coordinates. This was done "projecting" the center of the accelerometer to the surface of the structure, using a denoted measurement axis, normal to the surface.
    c. For the setups ##4,5,6, the orts of MCS were obtained, and the angle between the orts were computed. This allowed making statistics regarding orts' scatter, thus allowing to conclude about the orientation error.
5. Based on 35 estimations, the average positioning error is 11.2 mm ($\sigma$=4.8)

Figure 10A:
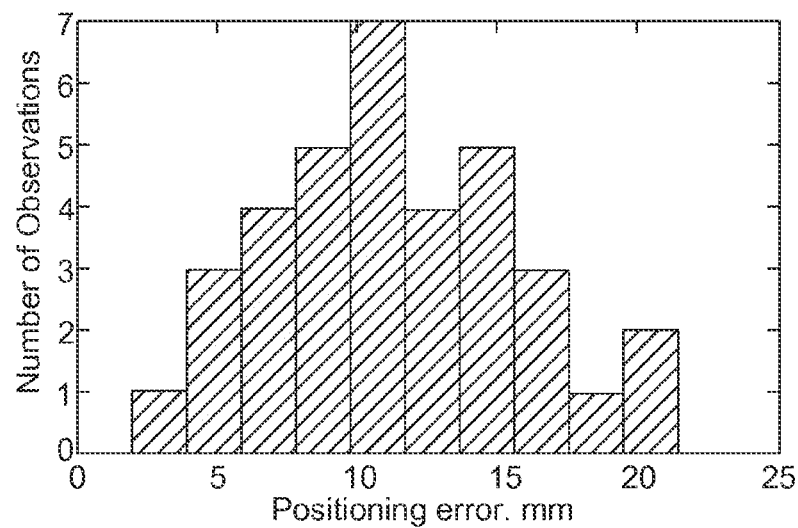
FIGS. 10A-B illustrate position and orientation errors of the determined spatial configurations as determined by an example of the process disclosed herein.

FIG. 10A shows a histogram of positioning errors. The histogram is based on the non-reference accelerometers. As the reference accelerometers can also be considered as belonging to test accelerometers, their position can also be compared to the known position, but they result in much smaller error. Thus, they were not included to the statistics. An example of sensor localizations is shown in FIGS. 6A-B. In particular, FIG. 6A shows a view of the digitized 3D model of the transmission housing 901 where the determined positions and orientations of the accelerometers are shown for example setup #2. FIG. 6B, an enlarged portion of the transmission housing an two accelerometer positions are shown including the known locations of the accelerometers which are indicated by black dots. The localization error is estimated as the distance between the black dot (obtained with 3D Creator) and a second dot, which is the projection of the estimated accelerometer centre to the mounting surface, as indicated in FIG. 6B by red arrows.

Figure 10B:
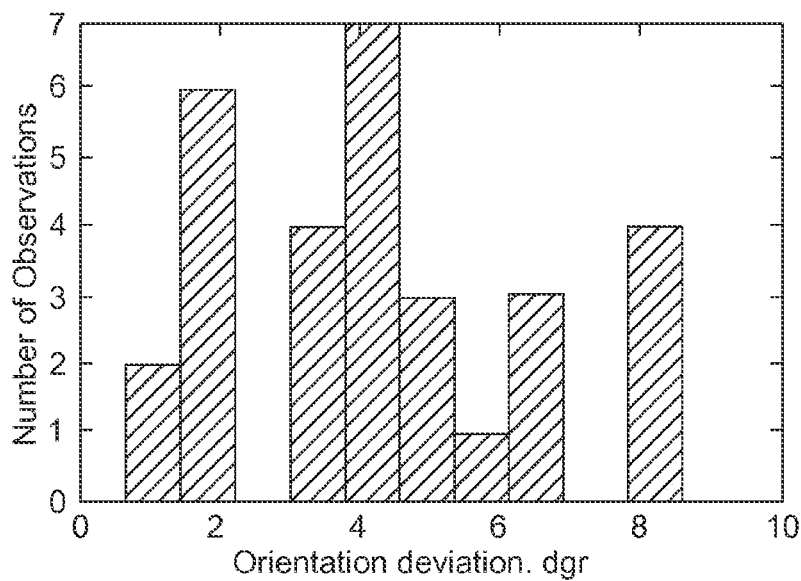

FIG. 10B shows a histogram of orientation errors. For each setup, there were 5 test accelerometers, thus 5 orts per direction. For each pair of orts, the angle between them was computed (as arccos of orts' scalar product); this resulted in 10 angles per direction, i.e. 30 angles for three directions. For the three Setups (#4,5,6), the statistics is:
    i. Setup #4: mean 4.3°, $\sigma$=2.3°.
    ii. Setup #5: mean 4.4°, $\sigma$=2.0°.
    iii. Setup #6: mean 6.0°, $\sigma$=2.5°.

For Setup #4, the histogram is shown in FIG. 10B.

Based on the above, it may thus be concluded that the method disclosed herein provides a reasonable quality of estimates, comparable with what is achievable with current techniques and sufficient for typical applications.

Embodiments of the method described herein may be employed during a test setup, in particular for the determination of the positions and orientations of transducers on a target object.

Embodiments of the method described herein may also be employed in order to verify the mounting of accelerometers, e.g. so as to verify that the position/orientation of the accelerometers has not changed during the test.

Similarly, embodiments of the method described herein may also be employed in order to create a digital representation, e.g. a digital 3D model, of a simplified geometry of the target object. In some measurement scenarios, it is convenient to make a simplified geometry of the target object, e.g. so as to visualize the obtained frequency response functions or mode shapes. As the suggested technique allows a determination of the accelerometers' positions it can be used for a quick and rough "digitizing" of the target object, by connecting obtained nodes, where the accelerometers are placed, with lines.

Embodiments of the method described herein can be implemented by means of hardware comprising several distinct elements, and/or at least in part by means of a suitably programmed microprocessor. In the apparatus claims enumerating several means, several of these means can be embodied by one and the same element, component or item of hardware. The mere fact that certain measures are recited in mutually different dependent claims or described in different embodiments does not indicate that a combination of these measures cannot be used to advantage.

It should be emphasized that the term "comprises/comprising" when used in this specification is taken to specify the presence of stated features, elements, steps or components but does not preclude the presence or addition of one or more other features, elements, steps, components or groups thereof.

The invention claimed is:

1. A computer-implemented method of determining respective spatial configurations, indicative of respective positions and orientations, of a plurality of transducers attached to a target object, the method comprising:
    receiving sensor signals from each of the plurality of transducers, the sensor signals being indicative of respective movements of the respective transducers during an induced movement of the target object; and
    determining the spatial configurations of the plurality of transducers comprising a first subset of transducers and a second subset of transducers, wherein the spatial configurations, indicative of the positions and orientations relative to the target object, of at least the first subset or the second subset of the plurality of transducers are determined based on the received sensor signals, and wherein determining the spatial configurations of the plurality of transducers comprises:
        obtaining the spatial configurations of the first subset of transducers; and
        determining the spatial configurations of the second subset of transducers from the received sensor signals and from the obtained spatial configurations of the first subset of transducers, and wherein the determining spatial configurations of the second subset of transducers comprises:
            computing, from the received sensor signals of the first subset of transducers and the received spatial configurations, object accelerations indicative of accelerations of the target object relative to a reference coordinate system;
            computing, from the computed object accelerations and from the received sensor signals of respective transducers of the second subset, said spatial configurations of the second subset of transducers.

2. The method of claim 1, wherein the transducers comprise respective triaxial accelerometers.

3. The method of claim 1, comprising receiving information representing only a part of the spatial configurations of the plurality of transducers as an input, and wherein determining the spatial configurations of the plurality of transducers comprises determining a remaining part of the spatial configurations in order to establish the complete spatial configurations of all transducers of the plurality of transducers.

4. The method of claim 1, wherein the first subset comprises three triaxial accelerometers.

5. The method of claim 1, wherein the first subset comprises a number of transducers sufficient to measure translatory movement of the target object along three orthogonal directions and rotational movement around three around orthogonal axes.

6. The method of claim 1, further comprising verifying whether the first subset includes a sufficient number of transducers.

7. The method of claim 1, wherein the transducers comprise respective triaxial accelerometers and wherein verifying comprises verifying whether a transformation matrix constructed from respective transducer transformation matrices of the transducers of the first subset has full rank, wherein each transducer transformation matrix represents a transformation between accelerations of the corresponding transducer relative to a local coordinate system of the target object to accelerations measured by said transducer along the axes of a measurement coordinate system of said transducer.

8. The method of claim 1, further comprising determining whether the induced movement is sufficient for determining the spatial configurations of the transducers of the second subset of transducers.

9. The method of claim 1, wherein the transducers comprise respective triaxial accelerometers; wherein the received sensor signals are indicative of measured accelerations of the transducers during the induced movement; and wherein determining whether the caused movement is sufficient for determining the spatial configurations of the transducers of the second subset comprises:
    optionally performing a low-pass filtering of the sensor signals;
    determining whether a local acceleration matrix representing the measured accelerations has a predetermined number of dominant singular values.

10. The method of claim 1, wherein obtaining the spatial configurations of the transducers of the first subset comprises:
    receiving information indicative of a set of spatial relationships between the transducers of the first subset;
    computing, from the received information and from the received sensor signals, the spatial configurations of the transducers of the first subset.

11. The method of claim 1, wherein the target object is a deformable object and the motion of the deformable object is restricted by an object support, and the method comprises:
    computing time-dependent acceleration coefficients of the target object from the spatial configurations of the transducers of the first subset and from the received sensor signals,
    computing, from the computed time-dependent acceleration coefficients and from the received sensor signals, the spatial configuration of the transducers of the second subset.

12. The method of claim 1, further comprising filtering the received signals so as to suppress frequencies associated with flexural modes of the induced movements.

13. The method of claim 1, wherein computing the object accelerations comprises computing a least-squares solution to a system of linear equations, each linear equation representing a transformation between measured accelerations, measured by one of the reference accelerometers, and unknown object accelerations.

14. A computer-implemented measurement process, comprising:
- determining spatial configurations of a plurality of transducers attached to a target object by performing the method of claim 1;
- receiving further sensor signals from the plurality of transducers, the received further sensor signals being indicative of respective movements of the respective transducers during an induced movement of the target object;
- performing structural analysis calculations based on the received further sensor signals.

15. A data processing system configured to perform the method of claim 1.

16. A measurement system comprising the data processing system of claim 15, and further comprising:
- a plurality of input channels configured to be coupled, via respective wireless or wired signal connections, to respective transducer output signals of a plurality of transducers attached to a target object; and
- a data input interface configured for receipt of respective spatial coordinate data of the transducers of the first subset from manual data entry or from another device via a wireless or wired data communication link.

17. A transducer assembly comprising the measurement system of claim 16, and further comprising,
- a plurality of transducers mountable at a plurality of predetermined measurement locations distributed across a target object.

18. A computer program configured to cause a data processing system to perform the method of claim 1 when the computer program is executed by the data processing system.

* * * * *